United States Patent
Harada et al.

(10) Patent No.: US 7,468,571 B2
(45) Date of Patent: Dec. 23, 2008

(54) ELECTROSTATICALLY DRIVEN LATCHABLE ACTUATOR SYSTEM

(75) Inventors: Hiroshi Harada, Hirakata (JP); Naomasa Oka, Osaka (JP); Yuji Suzuki, Osaka (JP); Hiroshi Fukshima, Kadoma (JP); Hiroshi Noge, Kyoto (JP); Jun Ogihara, Tondabayashi (JP); Kiyohiko Kawano, Kadoma (JP)

(73) Assignee: Matsushita Electric Works, Ltd., Kadoma-shi (JP)

( * ) Notice: Subject to any disclaimer, the term of this patent is extended or adjusted under 35 U.S.C. 154(b) by 499 days.

(21) Appl. No.: 10/569,101

(22) PCT Filed: Aug. 25, 2004

(86) PCT No.: PCT/JP2004/012662

§ 371 (c)(1),
(2), (4) Date: Feb. 22, 2006

(87) PCT Pub. No.: WO2005/020262

PCT Pub. Date: Mar. 3, 2005

(65) Prior Publication Data

US 2006/0261702 A1   Nov. 23, 2006

(30) Foreign Application Priority Data

Aug. 26, 2003   (JP) ............................ 2003-301549

(51) Int. Cl.
*G02B 26/08* (2006.01)
*H02N 1/00* (2006.01)
(52) U.S. Cl. ..................... 310/309; 385/18; 359/291; 359/872
(58) Field of Classification Search .............. 310/309; 385/16, 18, 20, 22, 49; 359/223, 224, 290, 359/291, 872

See application file for complete search history.

(56) References Cited

U.S. PATENT DOCUMENTS 5,214,727 A * 5/1993 Carr et al. ............... 385/22

(Continued)

FOREIGN PATENT DOCUMENTS

JP   2005074561   * 3/2005

(Continued)

*Primary Examiner*—Karl I Tamai
(74) *Attorney, Agent, or Firm*—Edwards Angell Palmer & Dodge LLP

(57) ABSTRACT

An electrostatically driven latchable actuator system has an actuator and a pair of side effectors on opposite ends of the actuator. The actuator is resiliently supported to a substrate and is movable along a linear axis between two operative positions as being electrically attracted to one of the side effectors. A latch mechanism is provided to mechanically latch the actuator at either of the operative positions. The side effectors are movably towards and away from the actuator along the linear axis between a normal position and a shifted position close to the actuator. Both of the side effectors are also resiliently supported to the substrate to be movable towards the actuator by being electrostatically attracted thereto and away from the actuator by resiliency. The moving side effector is interlocked to the latch mechanism through a mechanical link so as to unlatch the actuator in response to one of the side effectors being attracted to the actuator, and allow the actuator to move from one operative position to the other operative position to be again latched thereat.

13 Claims, 16 Drawing Sheets

U.S. PATENT DOCUMENTS

| | | | | |
|---|---|---|---|---|
| 5,998,906 A | * | 12/1999 | Jerman et al. | 310/309 |
| 6,360,033 B1 | | 3/2002 | Lee et al. | 385/15 |
| 6,388,359 B1 | | 5/2002 | Duelli et al. | 310/309 |
| 6,428,173 B1 | | 8/2002 | Dhuler et al. | 359/872 |
| 6,801,682 B2 | * | 10/2004 | Zhang et al. | 385/18 |
| 6,815,865 B2 | * | 11/2004 | Marxer | 310/309 |
| 6,996,306 B2 | * | 2/2006 | Chen et al. | 385/18 |
| 2002/0102059 A1 | | 8/2002 | Cho et al. | 385/49 |
| 2002/0172452 A1 | | 11/2002 | Zhang et al. | 385/15 |
| 2006/0261702 A1 | * | 11/2006 | Harada et al. | 310/309 |

FOREIGN PATENT DOCUMENTS

| | | | |
|---|---|---|---|
| JP | 2005245061 | * | 9/2005 |
| JP | 2005271187 | * | 10/2005 |

* cited by examiner

ELECTROSTATICALLY DRIVEN LATCHABLE ACTUATOR SYSTEM

TECHNICAL FIELD

The present invention is directed to an electrostatically driven latchable actuator system, and more particularly to the latchable actuator system of a type fabricated as the MEMS (Micro-Electro-Mechanical Systems).

BACKGROUND ART

US Patent Publication 2002-0102059 A1 discloses a prior art actuator system fabricated on a silicon substrate as the micro-electro-mechanical system for switching an optical path. The system includes an actuator carrying a shutter which selectively interrupts an optical path. The actuator is movably supported to the substrate and is formed with an electrode which is cooperative with a driving electrode fixed on the substrate to develop an electrostatically attracting force therebetween for shifting the actuator between two operative positions, one is an ON-position of receding the shutter from the optical path and the other is an OFF-position of projecting the shutter into the optical path. A mechanical latch is provided in the system to latch the actuator in the OFF-position. For this purpose, the actuator is formed at its one end with a catch which comes into latching engagement with dents when the actuator moves into the OFF-position. The dents are formed respectively at the ends of latching electrodes which are additionally incorporated on the substrate. Further, In order to unlatch the actuator, the system requires additional driving electrodes for driving the latching electrodes to move it electrostatically for disengaging the detents from the catch of the actuator. Thus, unlatching of the actuator is accomplished in the prior art system by introducing an additional set of electrodes other than those designed to drive the actuator itself. The inclusion of the additional electrodes largely detracts from the concept of the MEMS of giving a microstructure, and would be more critical when the actuator is required to be latched not only in the OFF-position but also in the ON-position since it requires a further set of electrodes for latching the actuator in the ON-position.

DISCLOSURE OF THE INVENTION

In view of the above problem, the present invention has been achieved to provide a unique latchable actuator system which is capable of latching the actuator without requiring an additional set of electrodes, i.e., by making the best use of electrodes essential to the operation of the actuator. The actuator system of the present invention includes a substrate carrying an actuator which is movable along a linear axis between two operative positions past a neutral position. The actuator is adapted in use to be connected to drive an object for shifting the object. The actuator is formed on its opposite ends respectively with center electrodes with respect to the linear axis, and is resiliently supported to the substrate to be given a spring bias by which the actuator is urged towards the neutral position. Also formed on the substrate are first and second side effectors which are disposed respectively on the opposite ends of the actuator with respect to the linear axis, and which are provided respectively with side electrodes that are held in electrostatically coupling relation with the adjacent center electrodes. A driving means is included in the system to develop an electrostatically attracting force between the center electrodes and the side electrodes for driving the actuator into either one of the two operating position. Also, the system includes latch means for latching the actuator in one of the operative positions, and unlatch means for unlatching the actuator to allow it to move out of said one operative position to the other position. The characterizing feature of the present invention resides in that the side effectors are movably towards and away from the actuator along the linear axis between a normal position and a shifted position close to the actuator, and that the unlatch means is interlocked with the movement of the side effectors in order to unlatch the actuator in response to one of the side effectors moving to its shifted position from the normal position, thereby allowing the actuator to move to the other operative position by electrostatically attracting force developed between the one of the side effectors and the actuator. With this arrangement, the side effectors act not only to move the actuator between the operative positions, but also acts to unlatch the actuator, realizing the latchable actuator system without requiring additional electrodes and therefore making it possible to arrange the system of a micro structure.

Preferably, the latch means is composed of catches formed respectively at opposite ends of the actuator and latch members formed on the substrate respectively adjacent to the side effectors. Each latch member has a detent engageable with the associated one of the catches of the actuator. Each catch takes two conditions in response to the movement of the actuator, i.e. latch-enabled condition where the catch is engageable with the detent for latching the actuator, and a latch-disabled condition where the catch is kept free from engageable with the detent. The actuator is disposed in such a relation with the latch member that one of the catches is held in the latch-disabled position when the other catch is in the latch-enabled position. That is, each one of the catches, in response to the movement of the actuator, comes into the latch-enabled position from the latch-enabled position so as to be held in latching engagement with the associated detent. The unlatch means includes a release links each mechanically coupling each one of the side effectors to each associated one of the latch members. Thus, each release links acts to move each corresponding one of the latch members forcibly for releasing the engagement of the detent with the catch, in response to the associated side effector moving to the shifted position, thereby unlatching said actuator. The release link may be realized by one or more springs formed on the substrate.

The latch members are preferred to be isolated electrically from the side electrodes for successfully applying the intended voltage difference across one or both of the side electrodes and the center electrodes.

The latch member is resiliently supported to the substrate to be movable between a latching position of engaging the detent with the associated catch in the latch-enabled condition, and a releasing position of releasing the detents from the catch in the latch-enabled condition. Thus, after the catch moves into the latch-enabled condition in consequence of the actuator movement, the latch member returns to the latching position for immediate latching the actuator in the operative position.

In a preferred embodiment, the system is designed such that both of the catches are held in the latch-disabled position when the actuator is in its neutral position. As the one side effector moves to the shifted position, the associated one of the release links forces the latch member into the release position and allows the catch that has been held in the latch-enabled condition to move into the latch-disabled condition, thereby unlatching the actuator and permitting it to move out from the one operative position. Further, each one of the caches is made engageable with the associated one of the latch members so as to force it to move from the latching position to the releasing position, in response to the actuator moving in a direction of being unlatched at the other catch, whereby the one catch is allowed to move from the latch-disabled condition to the latch-enabled condition for latching engagement with the latch member resiliently returning to the latching position. In this manner, when the latch member is driven by the adjacent side effector to unlatch the actuator at its one end, i.e., disengage the detent from the catch at that end, the catch is transferred into the latch-disabled condition in consequence of the resulting actuator movement, while the other catch is transferred into the latch-enabled condition to be ready for coming into the latching engagement with the associated latch member. Therefore, the actuator can be latched both at the two operative positions.

For driving the actuator into one of the operative positions from the neutral position, the driving means is configured to apply a voltage difference between the side electrodes of one of said side effectors and the center electrodes of the actuator. Likewise, for moving the actuator from each one of the operative positions to the other operative position, the like voltage difference is applied between the electrode of the one side effector and the center electrode. Further, for moving the actuator from any one of the operative positions to the neutral position, the voltage difference is applied between the side electrodes of the both side effectors and the center electrodes of the actuator.

In another preferred embodiment, the latch means additionally includes retainer means to hold the actuator around the neutral position in the absence of the electrostatically attracting force. Thus, the actuator can be stable at any one of the two operative positions and the neutral position, and accordingly give a tri-stable actuator system.

The latch means may be so designed to have a combination of at least one latch member resiliently supported to the substrate in an adjacent relation to each side effector, and a socket formed at each opposite end of the actuator. The latch member is fixed at its one end to the substrate and is formed at the other free end with a detent. The socket is shaped to releasably receive the detent and is formed at its open end with a catch engageable with the detent. When the actuator is in either one of the operative positions, one of the catches abuts against the detent outside of the socket for latching the actuator in this position. When the actuator moves out from one of the operative positions by being electrostatically attracted to one of the side effectors with one of the catches unlatched, the other catch at the opposite end of the actuator becomes engaged with the detent inside of the socket to resiliently deform the latch member, allowing the detent to escape outwardly of the socket. Thus, the latch member is permitted to return by its own resilience to be ready for the latching engagement with the catch outside of the socket after the actuator moves to the other operative position. In this instance, the unlatch member includes a release lever formed at each of the side effectors to be movable together therewith. The release lever is engageable with the latch member to constitute a mechanical link between the side effector and the latch member. When the release lever engages with the latch member in response to the associated side effector moving to the shifted position, it deforms the latch member for releasing the detent from the catch to thereby unlatch the actuator and allows the dent to advance it into the socket, enabling the actuator movement from the one operative position to the other operative position.

Preferably, each of the socket is formed in its interior with a retainer projection spaced inwardly from the catch along the linear axis. The retainer projection is held close to the catch when the actuator is in the neutral position, thereby retaining the actuator around its neutral position in the absence of the electrostatically attracting force and therefore hold the actuator stably also in the neutral position.

The above latchable actuator system may be well incorporated into an optical switch having an input optical guide adapted to receive a light signal, and at least two output optical guides each adapted to output the light signal. The actuator of the system is connected to a mirror reflecting the light signal incoming through the input optical guide for transmitting the light signal selectively to one of the output optical guides. Since the actuator system can be designed to a compact structure with the latching capability, the optical switch can be also made compact, yet be given a reliable switching function.

These and still other advantageous features of the present invention will become more apparent from the following detailed description of the preferred embodiments when taken in conjunction with the attached drawings.

BEST MODE FOR CARRYING OUT THE INVENTION

Figure 1:
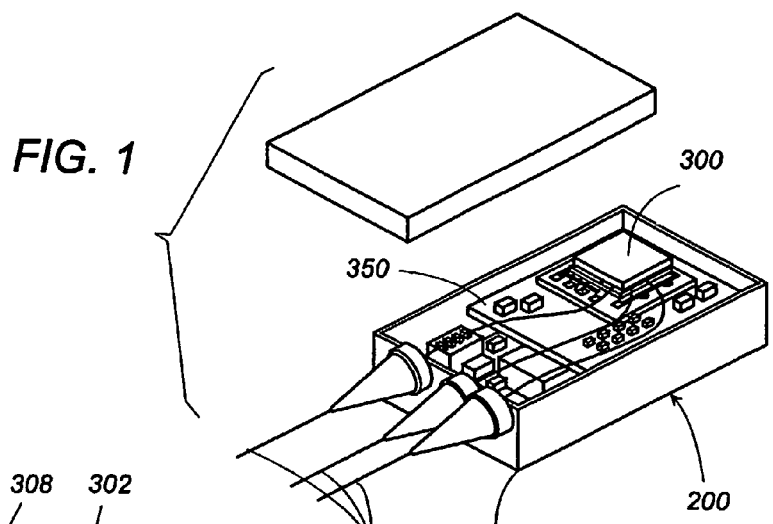
FIG. 1 is a perspective view of an actuator system in accordance with a first embodiment of the present invention where the system is incorporated into an optical switch.
Figure 2:
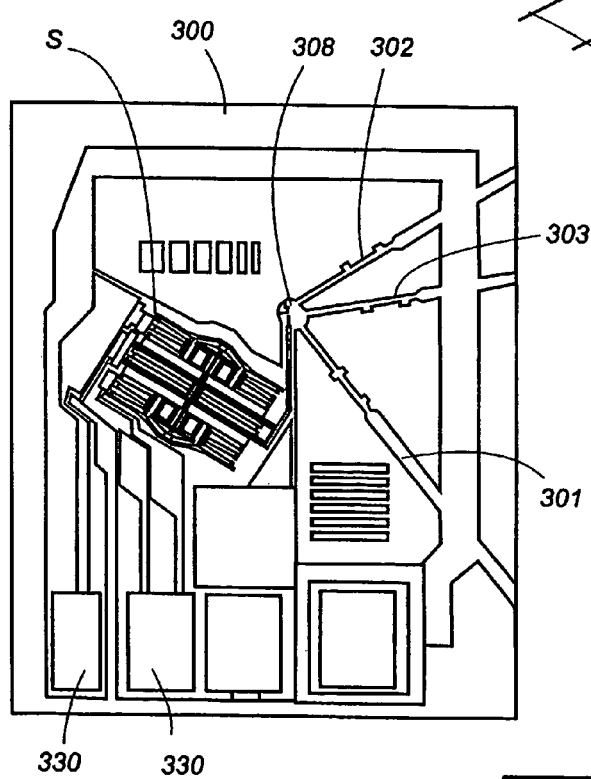
FIG. 2 is a top view of the optical switch incorporating the actuator system on a common substrate.
Figure 3:
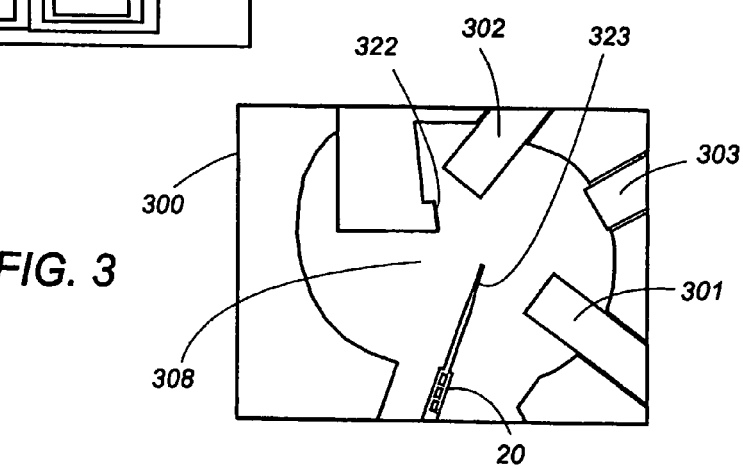
FIG. 3 is an enlarged view of a portion of the optical switch.

Referring to FIGS. 1 to 3, there is shown an optical switch 200 as one example in which an actuator system of the present invention is incorporated. The actuator system has an actuator which is utilized in the optical switch 200 for switching an incoming light signal to selective one of output optical guides 302 and 303. The optical switch 200 includes an integrated chip 300 fabricated into a micro-structure by a method generally referred to as MEMS (micro-electro-mechanical system) technology. The chip 300 includes the actuator system S as explained in detail hereinafter, and a set of electrodes 330 for energization of the actuator system, in addition to an input light guide 301 and the two output optical guides 302 and 303, as shown in FIG. 2. The optical guides receive respective optical fibers 360 leading to and from an optical fiber network.

As shown in FIG. 3, the input and output optical guides are arranged to have their ends gathered to a switch yard 308 together with two mirrors 322 and 323. One 322 of the mirrors is fixed to reflect the incoming light signal to the first output optical guide 302, while the other mirror 323 is connected to the actuator 20 of the actuator system to be movable between a reflecting position of reflecting the incoming light signal to the associated output light guide and a retracted position of disabling the reflection to the associated output light guide. Thus, the light signal is switched to the selected one of the output light guides by energizing or deenergizing the actuator system. The mirror is latched in either position after the actuator system is deenergized. As shown in FIG. 1, the chip 300 is accommodated within a casing 340 together with a printed board 350 forming a control circuit for driving the actuator system. The casing 340 is provided with connectors for connection of optical fibers 360 respectively to the input optical guide 301 and the output optical guides 302 and 303. It should be noted here that the above optical switch is illustrated only as one application of the actuator system, and therefore the actuator system of the present invention can be utilized in many other applications where the actuator is required to be latched.

First Embodiment

FIGS. 4 to 17

Figure 4:
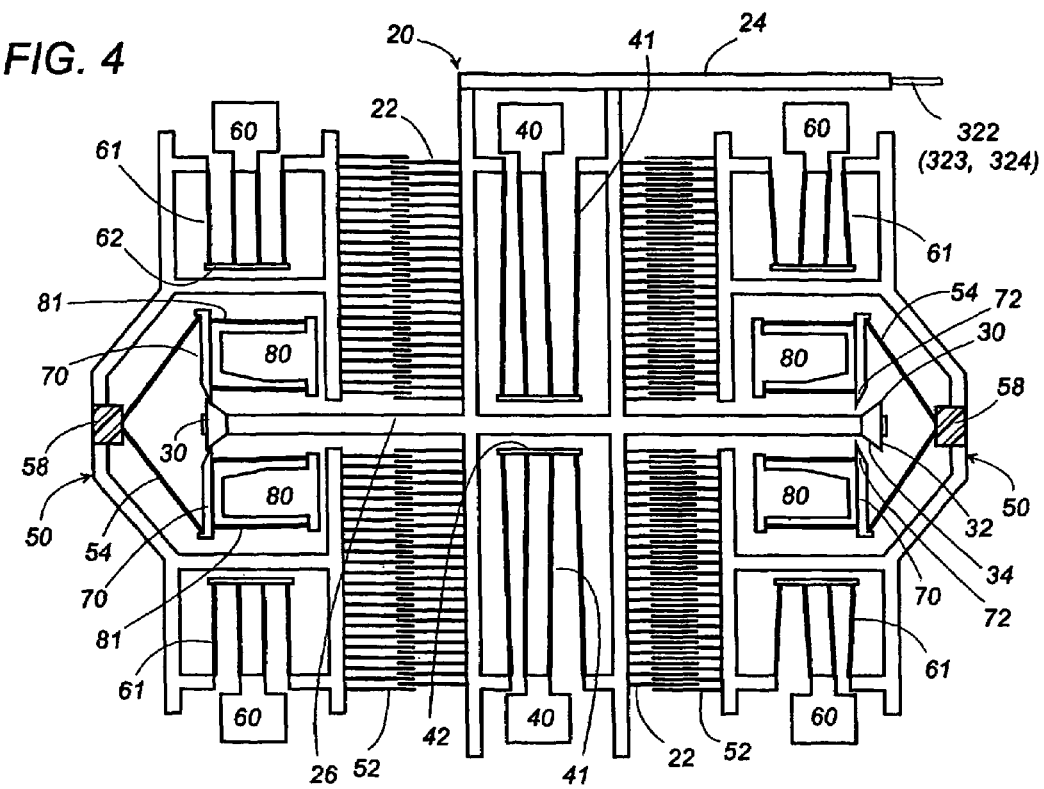
FIG. 4 is a plan view of the actuator system shown with an actuator in its neutral position.
Figure 5:
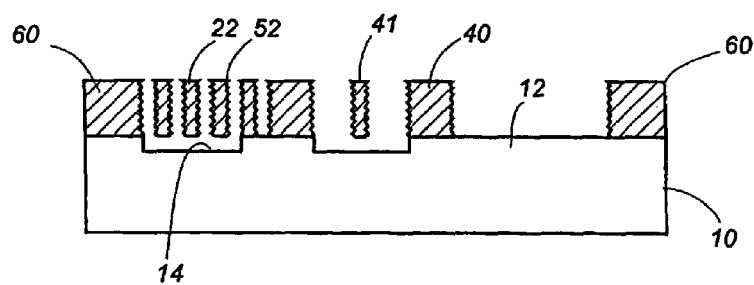
FIG. 5 is a sectional view of a part of the actuator system illustrating the MEMS technology by which the actuator system is fabricated.
Figure 6:
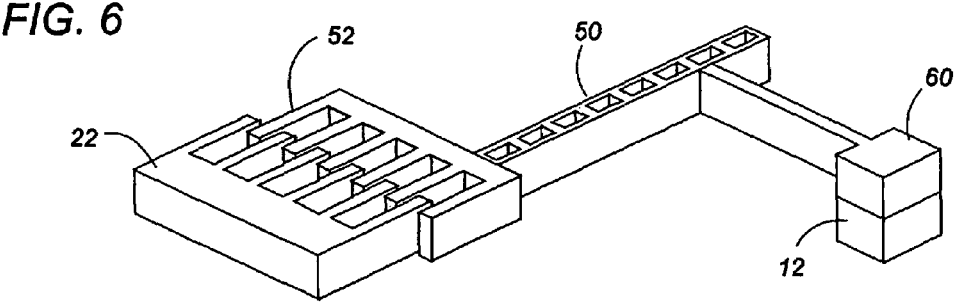
FIG. 6 is a partial perspective view of a part of the actuator system.

Now, the actuator system of the present invention is explained in detail. As shown in FIGS. 4 to 6, the actuator system is composed of movable components movably supported on a silicon substrate 10, and fixed components formed on the substrate 10 for resiliently supporting the movable components by means of springs, ones of the movable components. The movable and fixed components are also made from silicon by the MEMS technology. The movable components include a single actuator 20 movable along a linear axis and a pair of side effectors 50 disposed in a spaced relation from the opposite ends of the actuator 20, as shown in FIG. 4. The actuator 20 is supported to center posts 40, the fixed components, by means of springs 41 to be movable between two operative positions, and is urged to neutral position of FIG. 4 by the bias of the springs 41. The actuator 20 is integrally formed on its opposite ends with comb-shaped center electrodes 22, and also with an extension arm 24 carrying the mirror 323. Each side effector 50 is supported to side posts 60, the fixed components, by means of springs 61 to be movable along the linear axis between a normal position and a shifted position offset centrally along the linear axis from the normal position, and is biased towards the normal position by the bias of the springs 61. Each of the side effectors 50 is also provided with comb-shaped side electrode 52 which are held in an intermeshing relation with the adjacent center electrode 22 to develop an electrically attracting force therebetween. The movable and fixed components are arranged in a layer on the substrate 10 as shown in FIG. 5. In this connection, the substrate 10 is formed on its top with raised platforms 12 to leave recesses 14 in the remainder of the top. The fixed components are deposited on the raised platforms 12, while the movable components are held in a spaced relation respectively with the bottoms of the recesses 14 and are supported to the fixed components on the platforms 12 either directly or indirectly through the one or more of the other movable components, as schematically shown in FIG. 6. It is note that FIGS. 5 and 6 are given only for illustrating the layered structure as well as a generalized interconnection of the fixed and movable components, but do not reflect actual geometrical configuration of the components shown in FIG. 4.

Each of the center posts 40 is connected to the actuator 20 by the four springs 41 and a floating joint 42. The four springs are disposed in generally parallel relation with each other when the actuator 20 is in its neutral position with two inner springs 41 bridging across the center post 40 and the joint 42, and also with the other two outer springs 41 bridging across the joint 42 and the actuator 20, in order to elongate an effective spring length for giving a relatively long stroke to the axial movement of the actuator 20. Likewise, each side post 60 is connected to the side effector 50 by the four springs 61 and a floating joint 62 with two outer springs 61 bridging across the side post 60 and the joint 62, and also with the other two springs 61 bridging across the joint 62 and the side effector 50, in order to give a relatively long stroke to the axial movement of the side effector 50.

Also included in the movable components are latch members 70 each of which is disposed within a frame of the side effector 50 to constitute a latch mechanism, in combination with a catch 30 each formed at the opposite ends of the actuator 20, for latching the actuator in either of the operative positions. Each latch member 70 is movable in a direction perpendicular to the linear axis between a latching position of latching the actuator 20 in one of its operative positions and a releasing position of unlatching the actuator. Each latch member 70 is resiliently supported to an end post 80 by means of springs 81 to be urged thereby towards the latching position, and is also coupled to the adjacent side effector 50 by means of springs 54. The springs 54 define a release link which interlocks the latch member 70 with the movement of the associated side effector 50 for unlatching the actuator 20 as will be late discussed in detail. In short, the movable side effector 50 and the release link 54 is cooperative to constitute an unlatch mechanism for releasing the latch members 70 to thereby unlatch the actuator 20 and allow it to move from one of the operative position to the other operative position. Although each of the latch members 70 is held in the latching position when the actuator 20 is in the neutral position of FIG. 4, the actuator 20 is not latched in this position, as will be explained later.

The actuator 20 includes a center beam 26 extending along the linear axis and being formed at its opposite ends respectively with the catches 30 each in the form of a ratchet tooth. Each catch 30 is shaped to have rear vertical edges 32 responsible for latching engagement with detent 72 at the tip of the latch member 70 and inclined edges 34 sloping down from the rear edges to the beam 26 to be engageable with the detent 72 of the latch member 70. The catch 30 comes into the latching engagement with the detents 72 when the actuator 20 is in one of the operative positions, as shown at the left-hand latch members 70 in FIG. 10, thereby latching the actuator in this position. The inclined edges 34 come into sliding engagement with the detents 72, when the actuator 20 is moving from the neutral position to one of the operative position or from one of the operative position to the other operative position, as shown at the left-hand catch 30 in FIG. 7 and at the right-hand catch 30 of FIG. 12, such that the latch members 70 are forced to retract from the latching position to the releasing position, allowing the catch 30 to move axially inside of the latch members 70 and making the latch members 70 to be ready for the latching engagement with the catch 30.

Details of the latching actions will be explained in relation to the axial movement of the actuator 20 with reference to FIGS. 4 and 7 to 17. For the sake of understanding rather complicated operations of the latch mechanism, it is first mentioned that the catch 30 assumes different conditions which are different from different positions of the actuator 20 and that the catch 30 is held in a latch-disabled condition where it is kept axially outwardly of the latch members 70 to be unable to be latched thereby as shown in FIG. 4, and is held in a latch-enabled condition, as seen in the left-hand catch 30 in FIG. 8 and in the right-hand catch 30 in FIG. 13, where it comes axially inside of the latch members 70 so as to be capable of being latched at its rear vertical edges 32 with the latch member 70 returning to the latching position.

The latching actions are now explained in relation to three actuator movements. The actuator 20 is caused to move between the two operative positions by a driving means or circuit which applies a voltage difference across a selected combination of the electrodes. The voltage difference can be given, for example, by electrically charging either one or both of the side effectors, i.e., the side electrodes, while grounding the actuator, i.e., the center electrodes. For the sake of better understanding of the operations with reference to the drawings, the parts being energized or electrically charged are indicated by crossing lines in the figures. As seen in the figures, the side electrodes 52 are charged through respective posts 60 and the springs 61. Further, since the side electrodes and the center electrodes are integrally formed respectively with the side effector and the actuator, the side effector and the actuator are simply referred to in the description whenever their electrodes are electrically charged or applied with the voltage difference.

(1) Neutral Position to One of Two Operative Positions <FIGS. 4, and 7 to 10>.

Figure 7:
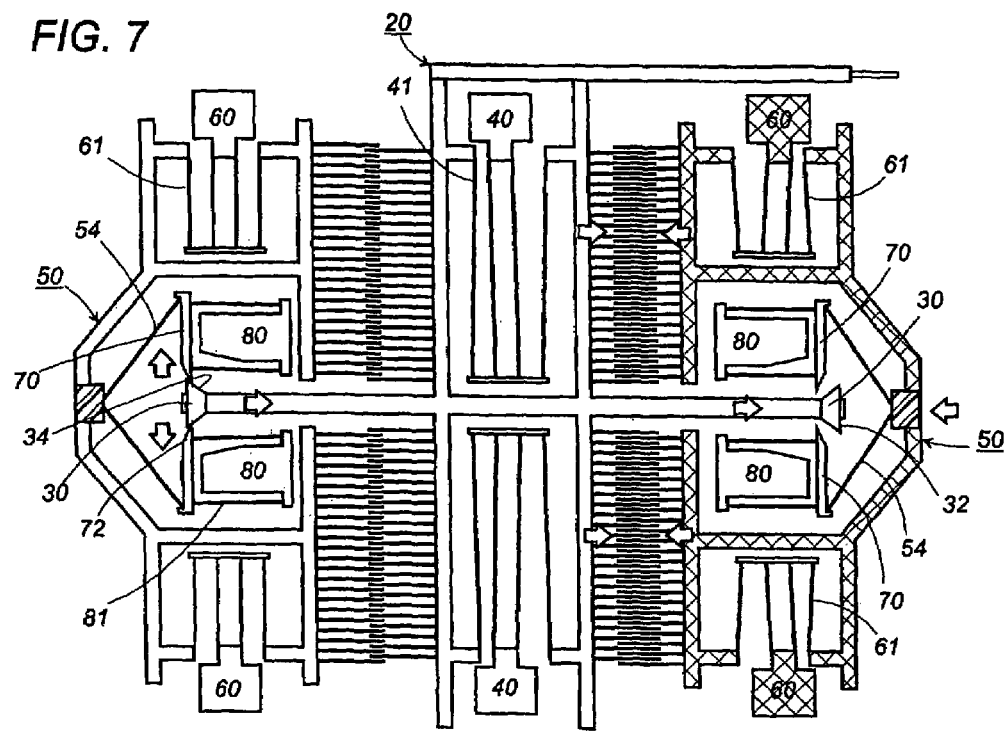
FIGS. 7 to 10 are respectively plan views illustrating the actuator movement from its neutral position to right operative position.
Figure 8:
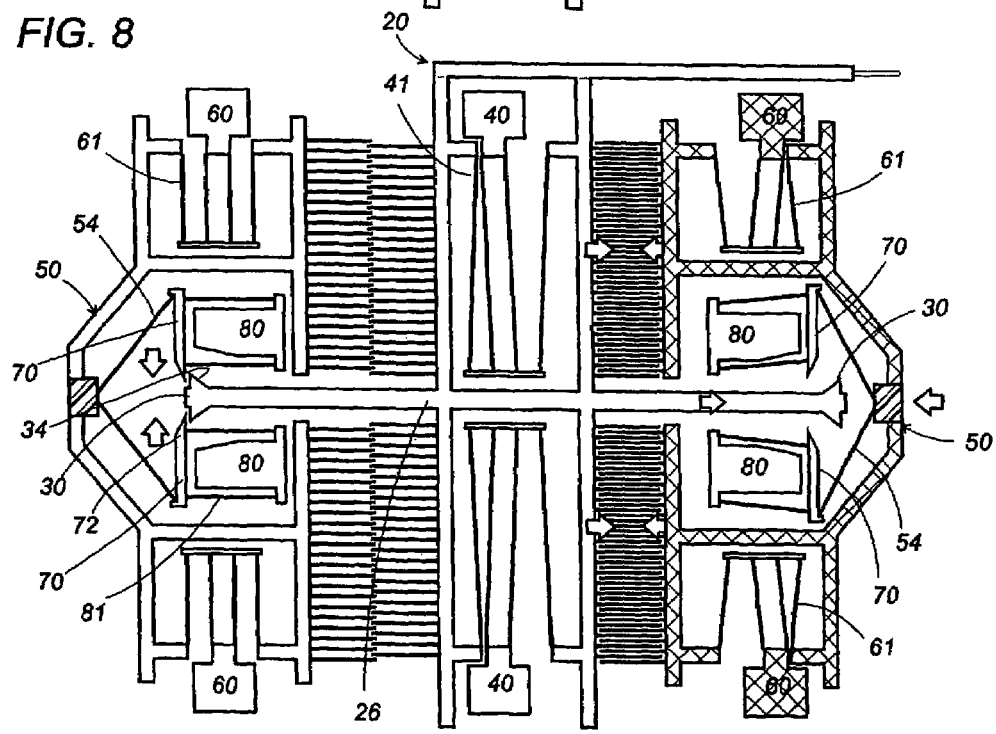
Figure 9:
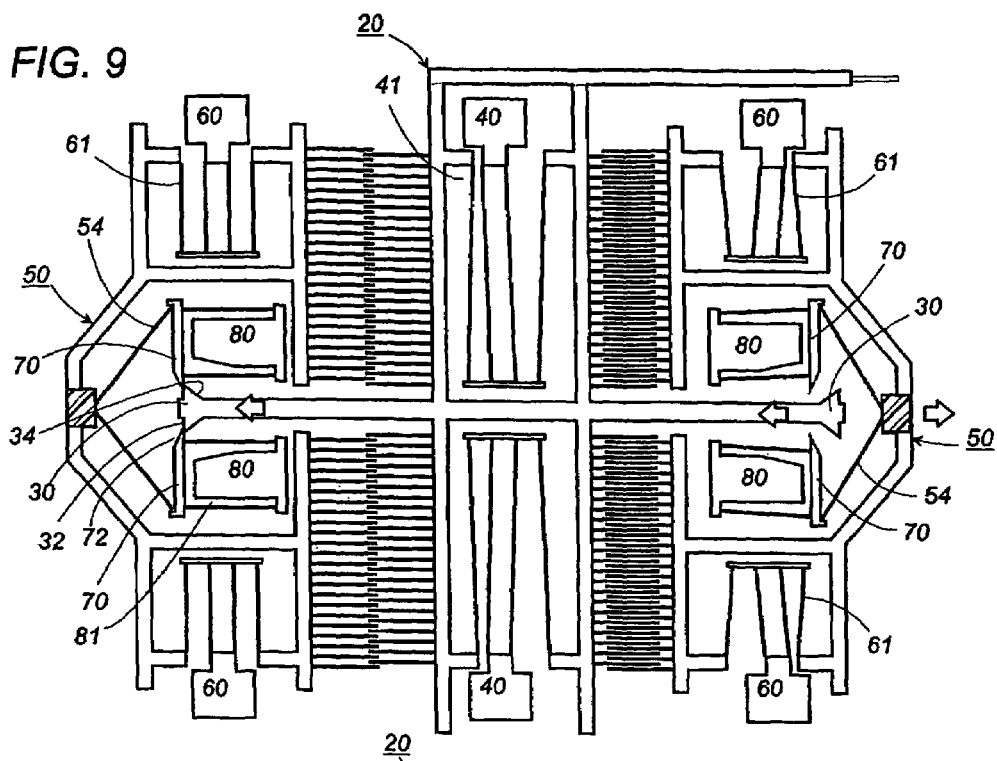
Figure 10:
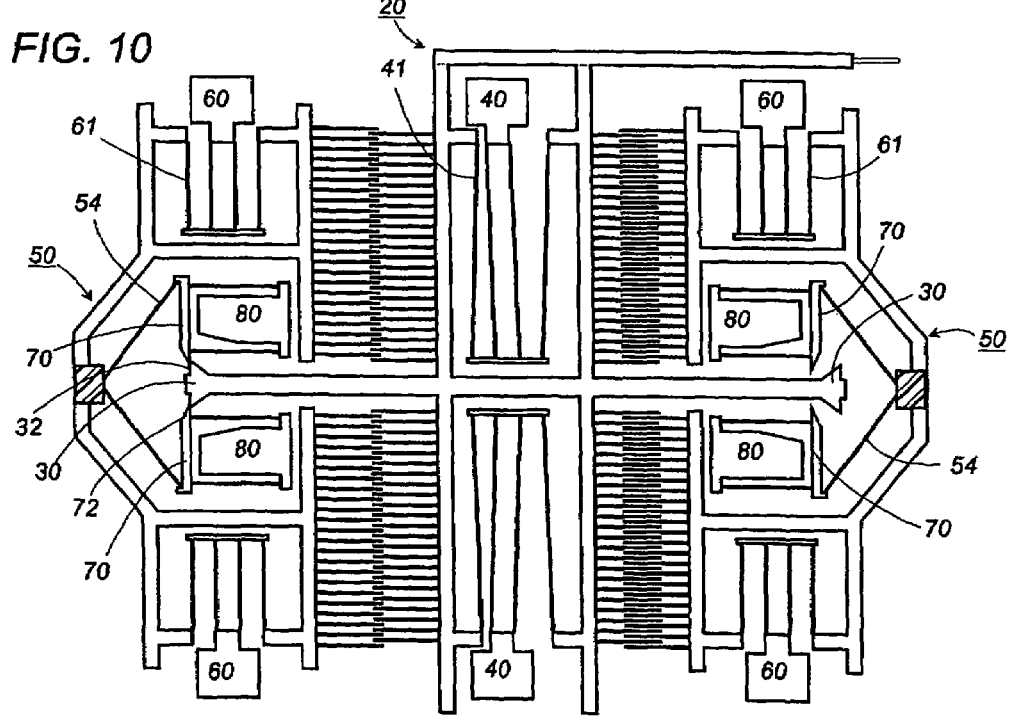

Firstly, the voltage difference is applied only across the right-hand side effector 50 and the actuator 20 in its neutral position of FIG. 4, to develop an electrostatically attracting force between the right-hand side effector 50 and the actuator 20, moving them towards to each other as indicated by arrows in FIG. 7. In this consequence, the left-hand catch 30 comes into engagement with the latch members 70 to force it towards the releasing position against the bias of the springs 81. At this time, the right-hand catch 30 is kept in the latch-disabled condition. As the actuator 20 moves further to the most-right end of FIG. 8, where it is closest to the side effector 50 moved to its shifted position, the left-hand catch 30 advances to its latch-enabled condition, while the left-hand latch members 70 return to their latching position by the bias of the springs 81 so as to be ready for latching the actuator 20 at the left-hand catch 30. Upon subsequent deenergization of the right-hand side effector 50, i.e., removal of the electrostatically attracting force, the actuator 20 is caused to move back by the bias of the springs 41 to only a slightest extent until the left-hand catch 30 abuts against the detents 72 of the latch members 70 already returned to the latching position, as shown in FIG. 9, thereby latching the actuator 20 in the right operative position to keep it from moving back toward the neutral position. At the same time, the right-hand side effector 50 moves back to the normal position as show in FIG. 10, with the actuator 20 is kept latched at the left-hand catch 30 and with the right-hand catch 30 held in the latch-disabled condition.

(2) Right Operative Position of Left Operative Position <FIGS. 11 to 14>

Figure 11:
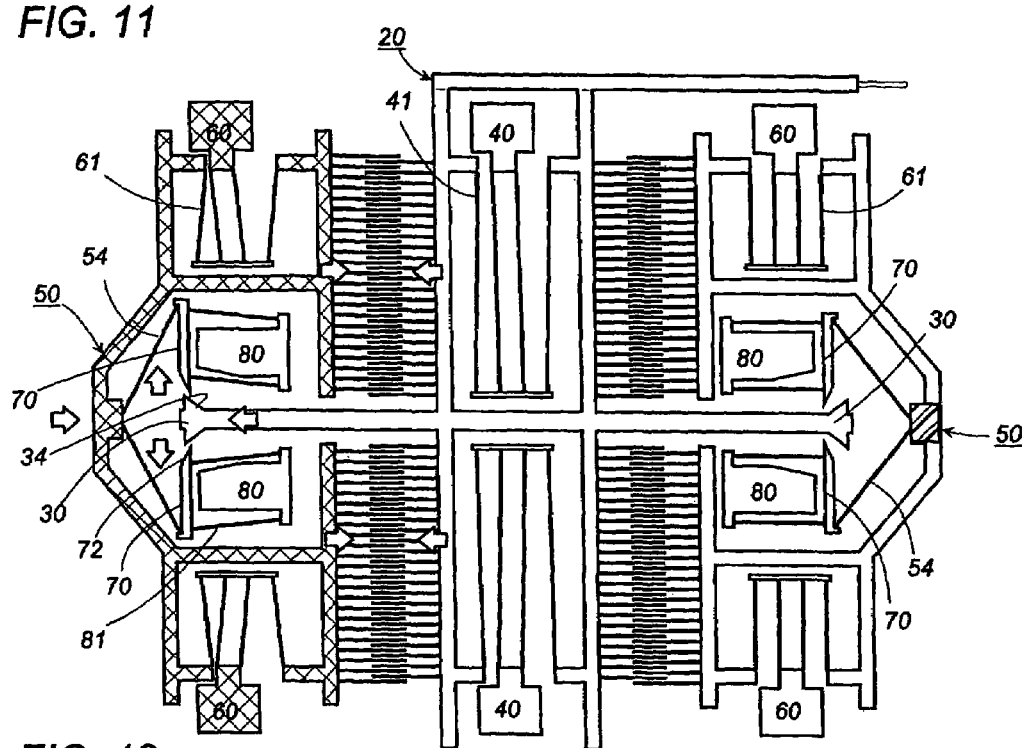
FIGS. 11 to 14 are respectively plan views illustrating the actuator movement from the right operative position to a left operative position.
Figure 12:
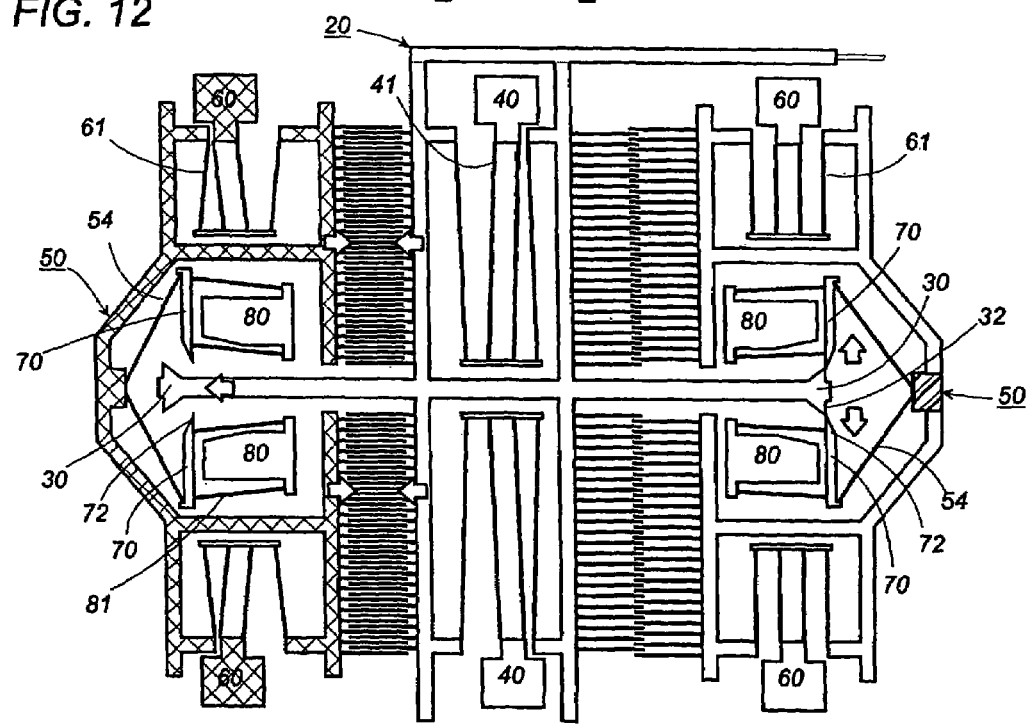
Figure 13:
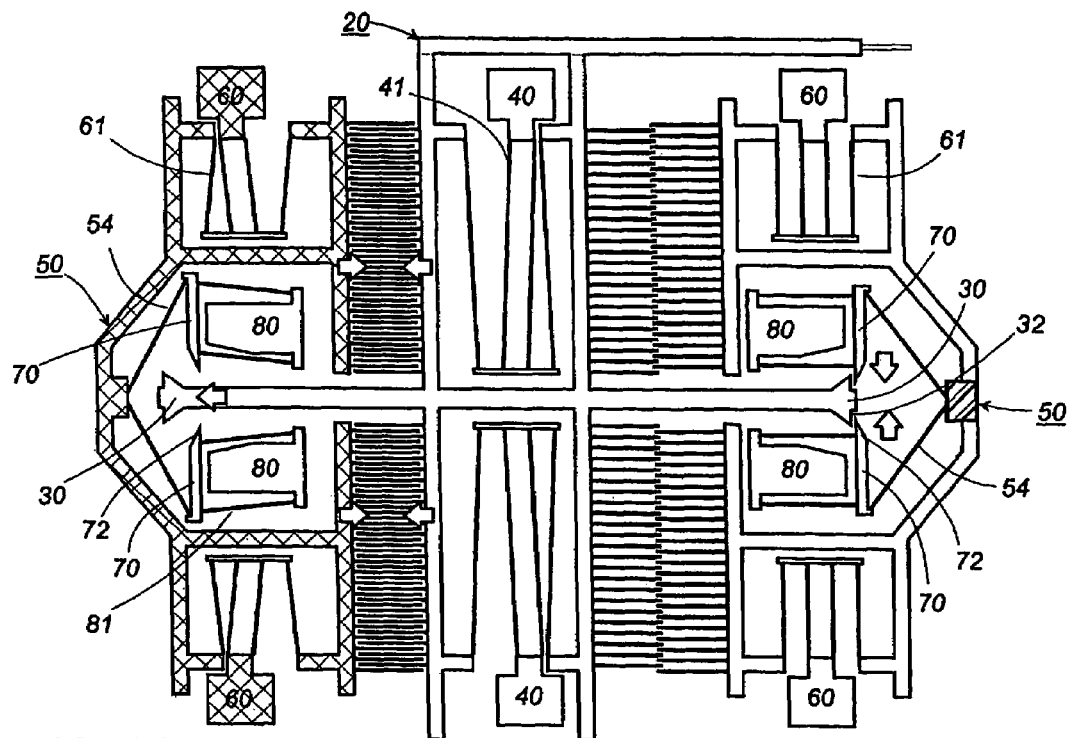
Figure 14:
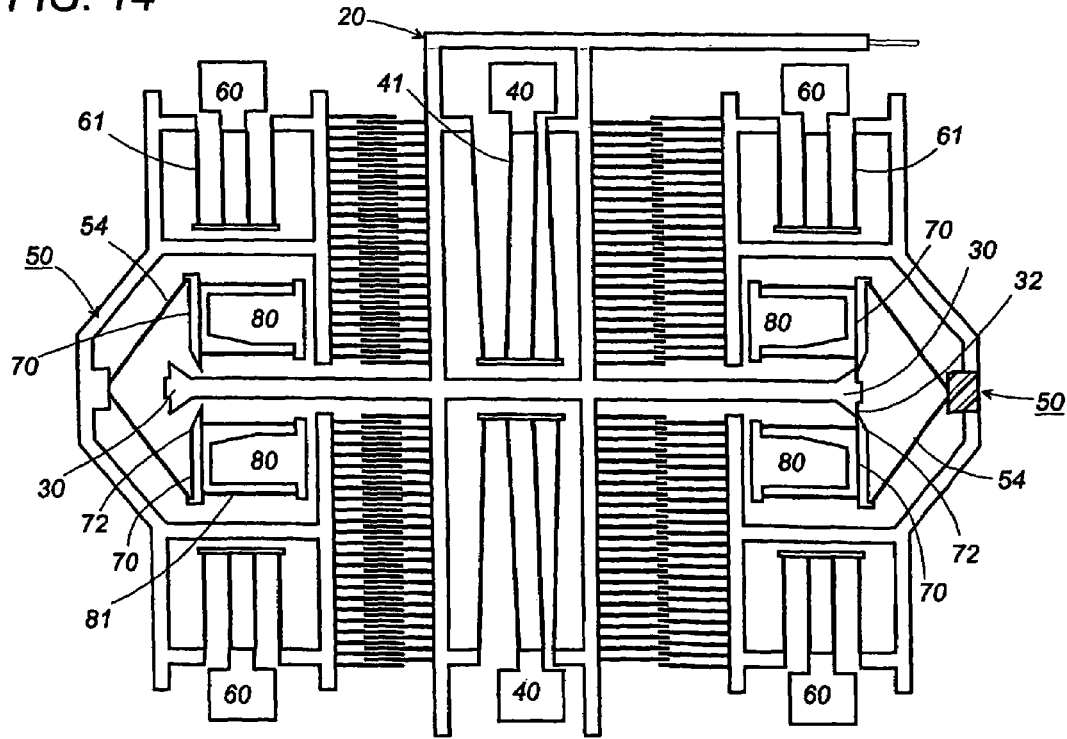

The voltage difference is applied only across the left-hand side effector 50 and the actuator 20, in order to electrostatically attract the left-hand side effector 50 and the actuator 20 to each other. As a result of the left-hand side effector 50 moving to the shifted position, as shown in FIG. 11, it forces the associated latch members 70 through the release link or the springs 54 to move the latch members 70 into the releasing position against the bias of the springs 81. Thus, the actuator 20 is allowed to move to the left by the electrostatically attracting force. As the actuator 20 moves further to a position of FIG. 12, the right-hand catch 30 at the rear moving end of the actuator 20 comes into engagement at its inclined edges 34 with the associated latch members 70 to force them into the releasing position, thereby permitting the further actuator movement with attendant movement of the catch 30 at the rear moving end of the actuator into the latch-enabled condition. During this movement, the catch 30 at the front moving end of the actuator goes into the latch-disabled condition. When the actuator 20 moves further to be closest to the left-hand side effector 50, as shown in FIG. 13, the right-hand latch members 70 return to the latching position by the springs 81 so as to be ready for the latching engagement with the catch 30 at the rear moving end of the actuator 20. Upon subsequent removal of the electrostatically attracting force, the actuator 20 moves back by the bias of the springs 41 to a slightest extent until the right-hand catch 30 comes into abutment against the latch members 70, as shown in FIG. 14, thereby latching the actuator 20 in the left operative position. Simultaneously, the left-hand side effector 50 returns to its normal position by the bias of the springs 51 with the left-hand catch 30 being kept in the latch-disabled condition. In the like manner, the actuator 20 is caused to move from the left operative position to the right operative position to be latched thereat by firstly applying the voltage difference only across the right-hand side effector 50 and the actuator 20 followed by removing the voltage difference.

Figure 15:
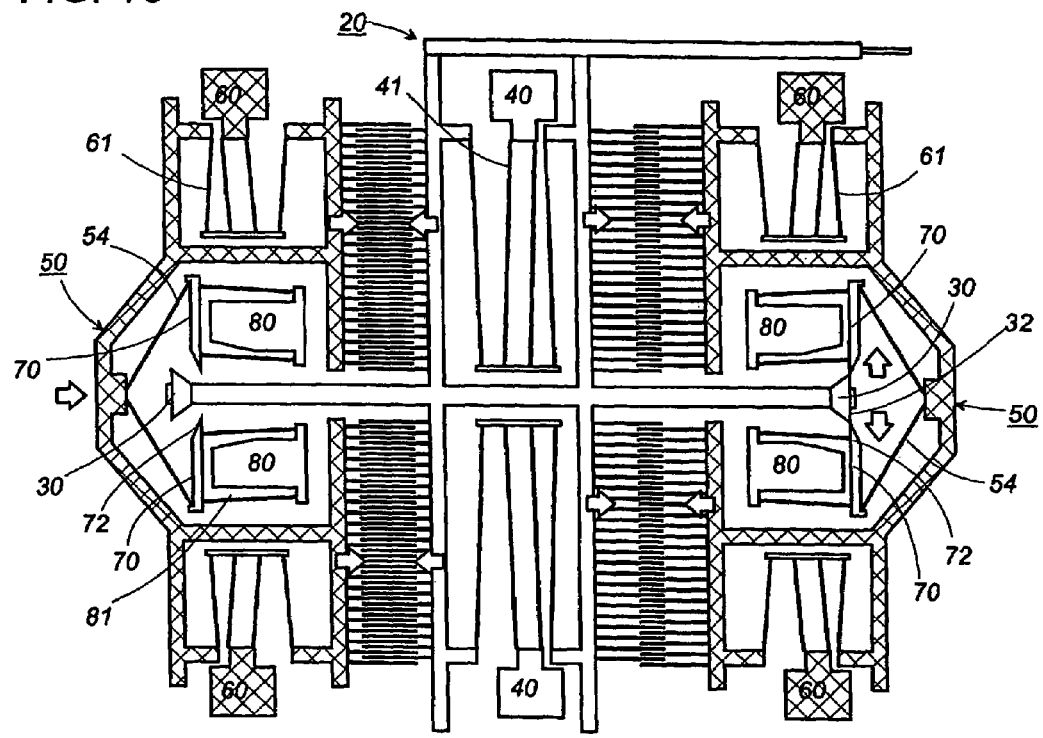
FIGS. 15 to 17 are respectively plan views illustrating the actuator movement from the left operative position to the neutral position.
Figure 16:
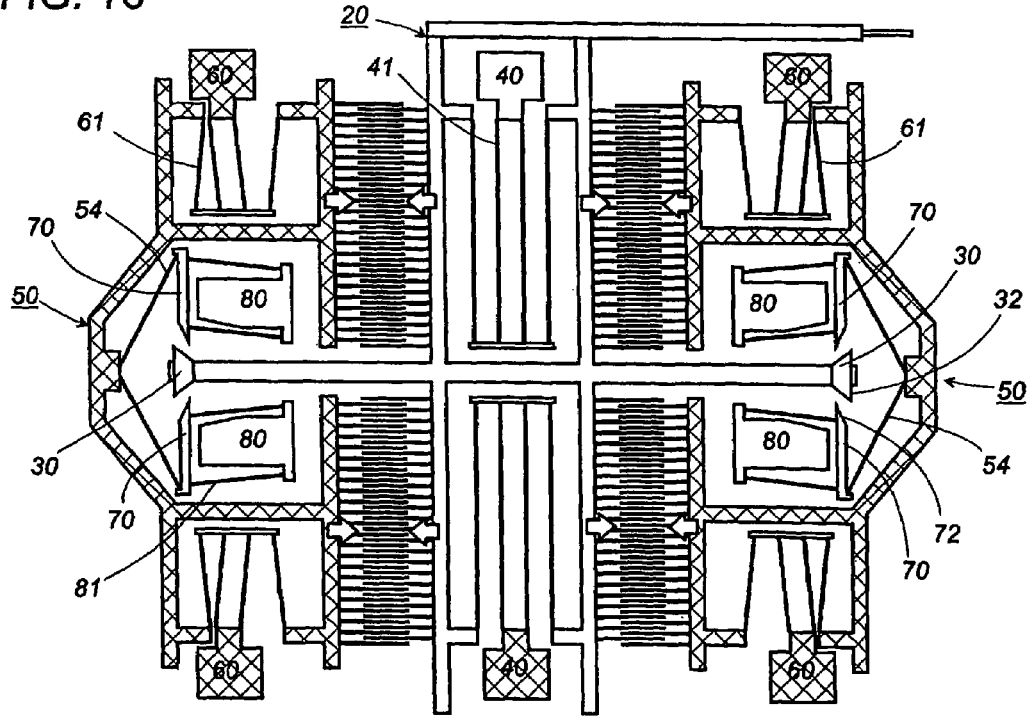
Figure 17:
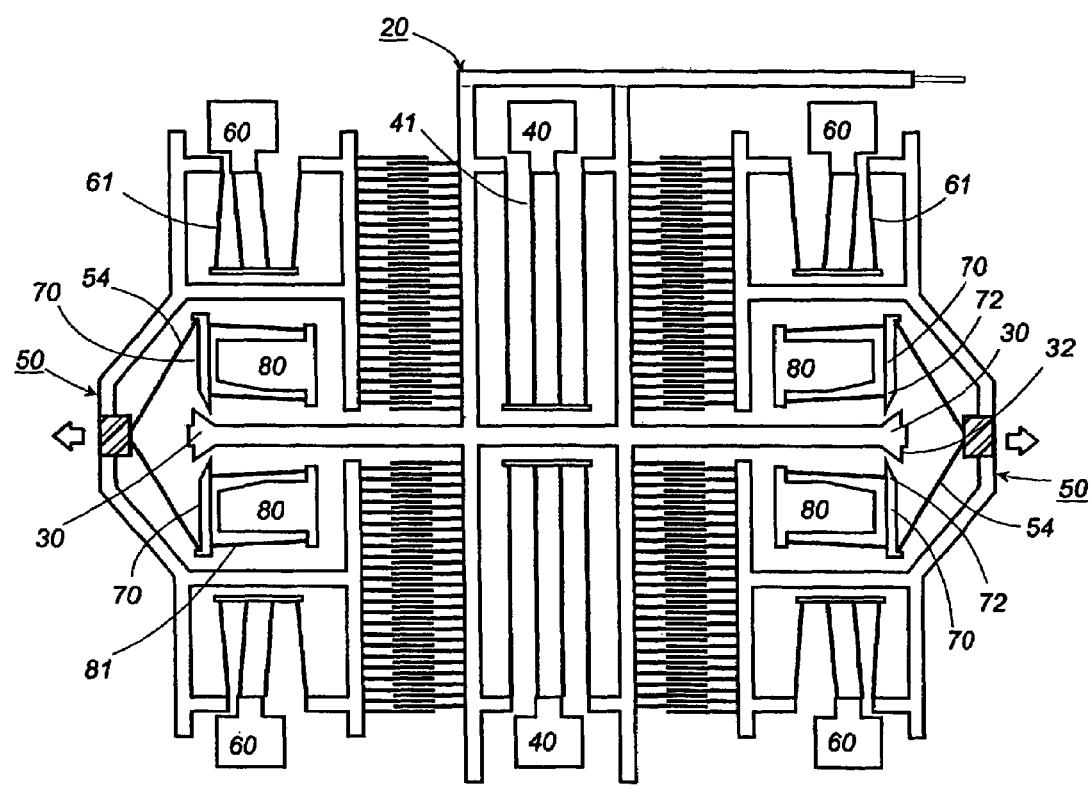

(3) Left Operative Position to the Neutral Position <FIGS. 15 to 17>

The voltage difference is applied across the two side effectors 50 and the actuator 20, in order to move both side effectors 50 towards the actuator 20 by the electrostatically attracting forces, as shown in FIG. 15. Upon this occurrence, the right-hand side effector 50 moves to the shifted position to force the latch members 70 into the releasing position, thereby unlatching the actuator 20 and allowing it to move to the right by the bias of the springs 41 as well as the balancing electrostatic attracting forces. As the actuator 20 moves further into the neutral position, as shown in FIG. 16, with both of the side effectors 50 being kept in the shifted positions, the left- and right-hand catches 30 are held in the latch-disabled condition. After removal of the electrostatically attracting forces, both of the side effectors 50 are returning to the normal position by the bias of the springs 61 and allowing the left- and right-hand latch members 70 to return to the latching position but not in actual latching engagement with the corresponding catches 30, as shown in FIG. 17. Then, the actuator 20 is kept at the neutral position of FIG. 4 by the bias of the springs 41. In this sense, the illustrated actuator system gives the actuator which is a held at either of three positions and mechanically latched at either of two operative positions. Although not specifically mentioned in the above explanation of the latching actions, the springs 54 also act to move the side effector 50 back to the normal position in cooperation with the resiliently returning movement of the latch members 70 to the latching position, after the electrostatically attracting force is removed from the side effector 50.

It is noted in this connection that each side post 60 connected to each side effector 50 is electrically isolated from the center posts 40 coupled through the springs 41 to the actuator 20 in order to successfully apply the intended voltage difference across one or both of the side effectors 50 and the actuator 20. In addition, each side effector 50 is formed with dielectric section 58 which isolates the latch members 70 electrically from the associate side effector 50, thereby keeping the actuator 20 from conducting electrically to the side effector 50 through the latch members 70 and therefore assuring to apply the intended voltage difference between the side effector 50 and the actuator 20.

Second Embodiment

FIGS. 18 TO 32

FIGS. 18 to 33 illustrate another actuator system in accordance with a second embodiment of the present invention, which is similar to the first embodiment except for the details of the latching mechanism. Accordingly, no duplicate explanation is deemed necessary for the details of the basic structures of the system. The system includes an actuator 120 and a pair of side effectors 150 as in the above embodiment. The actuator 120 is integrally formed with the like comb-shaped center electrodes 122 and is resiliently supported to the center posts 140 by means of springs 141 to be movable along a linear axis between two operative positions past a neutral position against the bias of the springs 141. Each of the side effectors 150 located on opposite ends of the actuator 120 is integrally formed with like com-shaped side electrodes 152, and is resiliently supported to the side posts 160 by means of springs 161 to be movable along the linear axis between a normal or unbiased position and a shifted position close to the actuator 120.

Also in this embodiment, two latching mechanisms are provided respectively on opposite ends of the actuator 120 for latching it in either of the two operative positions. Each latching mechanism includes a latch member 170, and a socket 130 on each opposite end of the actuator 120. The latch member 170 is coupled to an end post 180, the fixed component on the substrate 10, and is shaped into a generally U-shaped configuration with a pair of resilient legs 171 connected by a web 173 at which the latch member 170 is supported to the end post 180. The resilient legs 171 are resiliently deformable to assume two positions, one is a latching position where the resilient legs 171 runs parallel to each other without being deformed, as seen at the right-hand latch member 170 in FIG. 22, and a releasing position where the resilient legs 171 are deformed or collapsed to come close to each other, as seen at the right-hand latch member 170 in FIG. 23. Each resilient leg 171 is formed with a detent 172 at its distal end for latching engagement with the outer end of the socket 130 s seen at the right-hand latch member 170 in FIG. 22.

Figure 19:
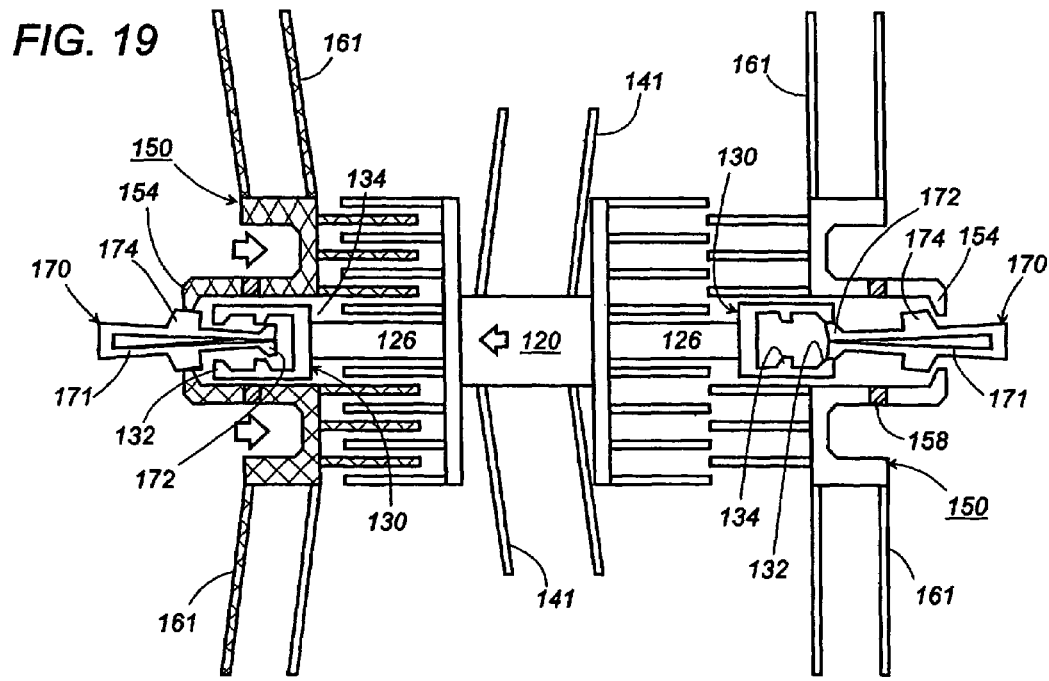
FIGS. 19 to 22 are respectively plan views illustrating the actuator movement of the above actuator system from its neutral position to left operative position.
Figure 20:
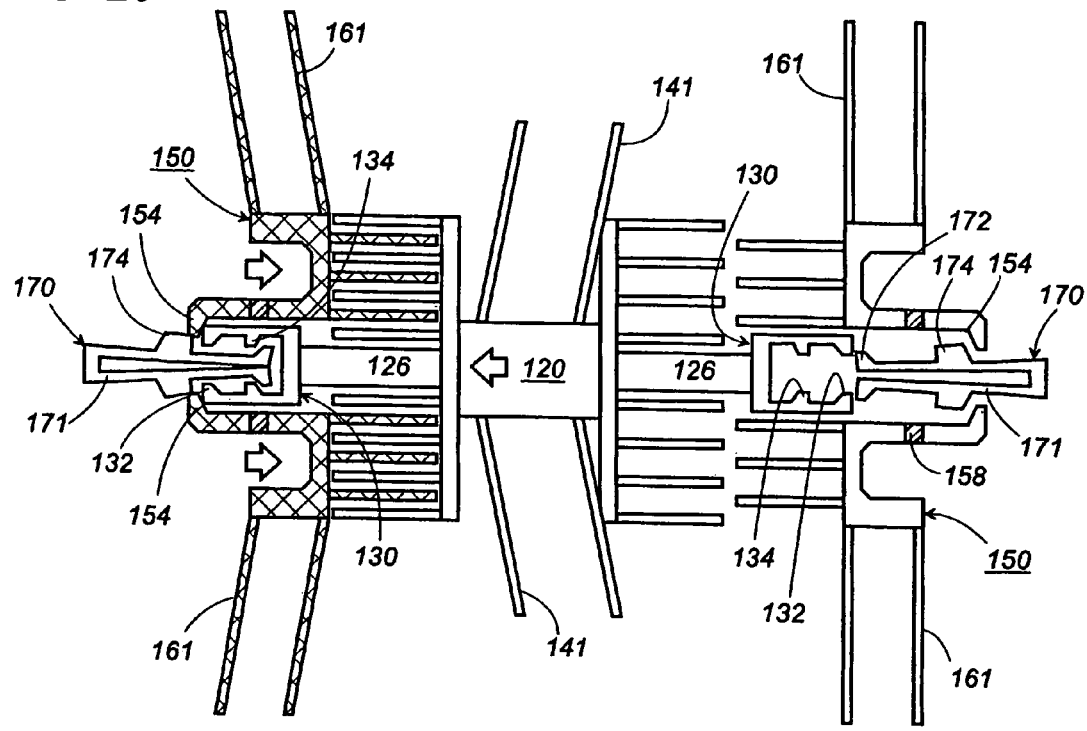
Figure 21:
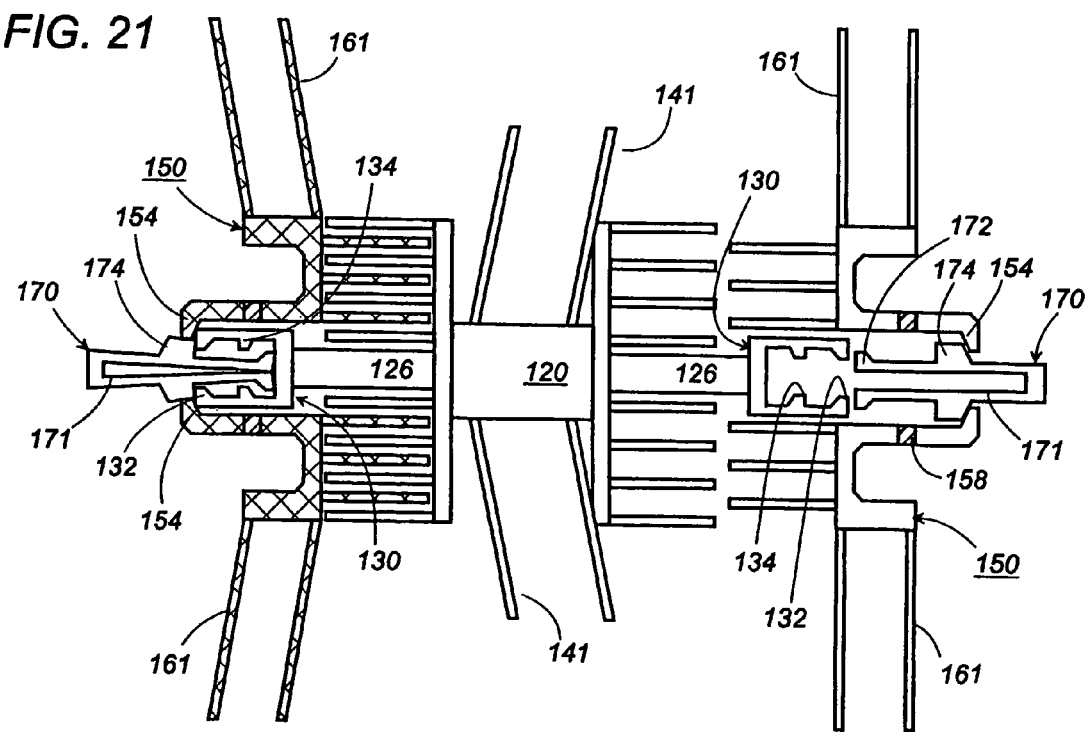

Each resilient leg 171 is formed with a projection 174 which is spaced inwardly from the detent 172 to be engageable with a release lever 154 formed on each of the side effectors 150, as shown at the left-hand latch member 170 in FIGS. 19 to 21. The release lever 154 establishes a mechanical linkage between each of the side effectors 150 and the associated one of the latch members 170, and is cooperative with the moving side effector 150 to define the unlatch mechanism for unlatching the actuator 120.

The socket 130 is formed integrally at each of the opposite ends of the center beam 126 of the actuator 120 to have an axial open end through which the resilient legs 171 are allowed to advance into the interior of the socket 130, as shown at the right-hand socket 130 in FIGS. 24 to 27, for example. Inward projections are formed at the open end of the socket 130 to define catches 132 which come into abutment with the detents 172 of the latch member 170 when the resilient legs 171 comes out of the socket 130, as shown at the right-hand socket 130 in FIG. 22, for example. The socket 130 is also formed with retainer projections 134 which are offset axially inwardly of the catches 132 to be in closely adjacent relation to the detents 172 of the latch member 170 when the actuator 120 is in the neutral position of FIG. 18, for retaining or locking the actuator 120 around the neutral position.

The latching actions of the second embodiment are now explained in relation to three actuator movements.

(1) Neutral Position to Left Operative Position <FIGS. 18 to 22>

Figure 18:
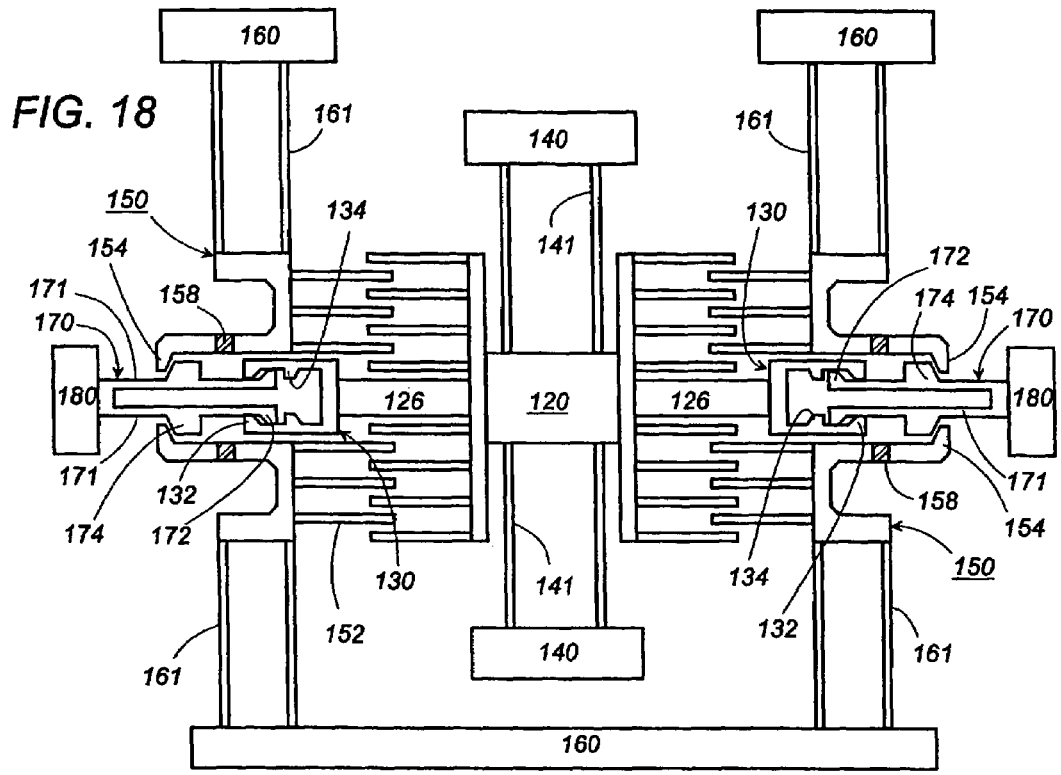
FIG. 18 is a plan view of an actuator system in accordance with a second embodiment of the present invention.
Figure 22:
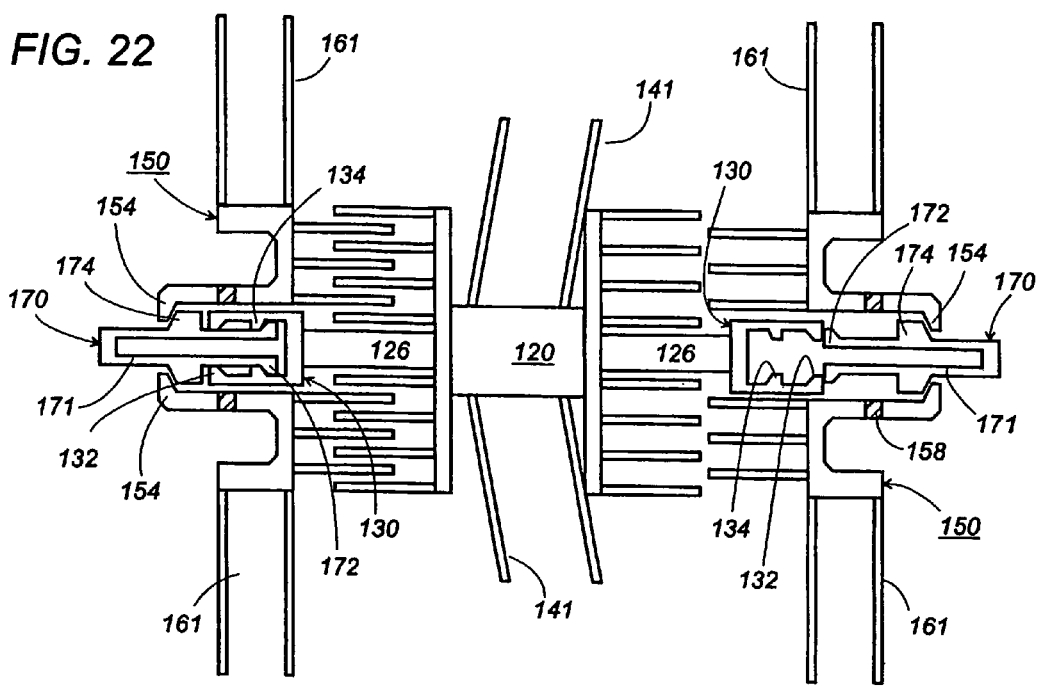

In the absence of the electrically attracting force, the actuator 120 is held in the neutral position of FIG. 18 by being urged by the springs 141 respectively connecting the actuator 120 to the center posts 140. By applying the voltage difference only across the left-hand side effector 150 and the actuator 120, the actuator 120 starts moving to the left, and at the same time the left-hand side effector 150 starts moving moves to the right by the electrostatically attracting force, as shown in FIG. 19. As the left-hand side effector 150 moves to the right, the release levers 154 press the projections 174 of the latch member 170 to thereby deform the resilient legs 171 into the releasing position and allow the legs 171 to advance into the corresponding socket 130. With this result, the retainer projections 134 become free from interfering with the detents 172. At the same time, the right-hand socket 130 moving to the left becomes engaged at the catches 132 with the detents 172 of the associated latch member 170, deforming or collapsing the resilient legs 171 into the releasing position and consequently allowing the socket 130 to be disengaged from the latch member 170. Thus, the actuator 120 is permitted to move further to the left-most position of FIG. 20. Immediately thereafter, the resilient legs 171 of the right-hand latch member 170 return or spring back to the latching position to be ready for the latching engagement with the corresponding catches 132, as shown in FIG. 21. Upon removal of the electrostatically attracting force, the actuator 120 moves back to the right by the bias of the springs 141 only to a slightest extent until the catches 132 abut against the detents 172 at the right-hand latch member 170, as shown in FIG. 22, and is latched in this operative position. At the same time, the left-hand side effector 150 returns back by the bias of the springs 161 into the normal position, as shown in FIG. 22, completing the actuator movement with the latching of the actuator.

(2) Left Operative Position to Right Operative Position <FIGS. 23 to 28>

Figure 23:
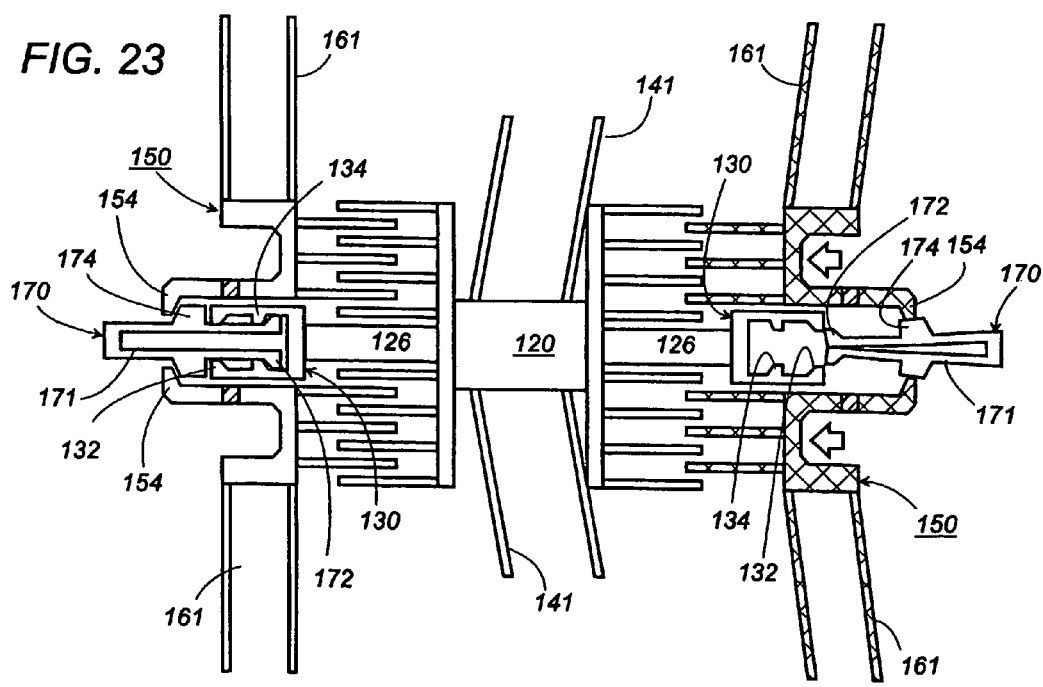
FIGS. 23 to 28 are respectively plan views illustrating the actuator movement from the left operative position to right operative position.
Figure 24:
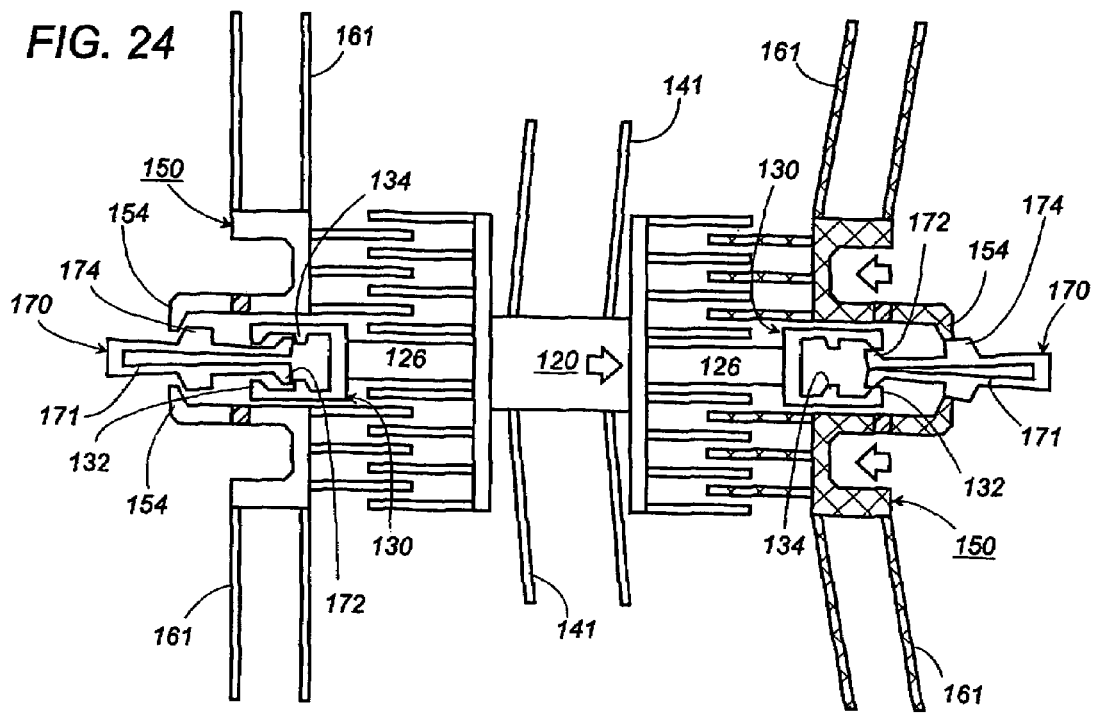
Figure 25:
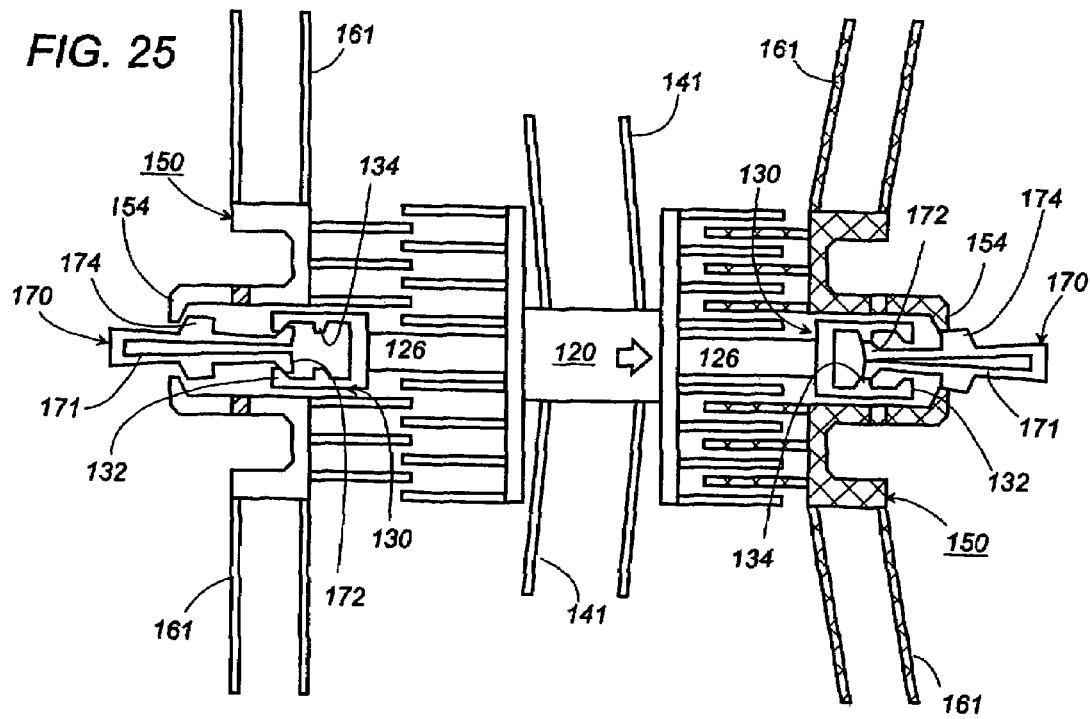
Figure 26:
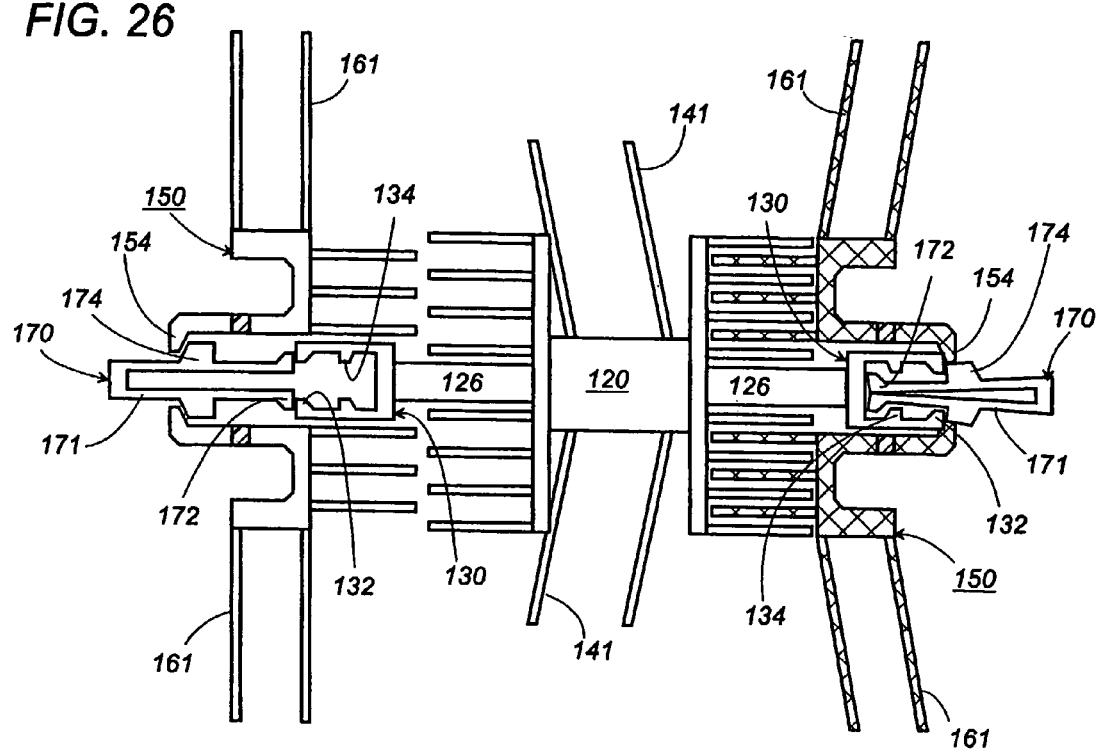
Figure 27:
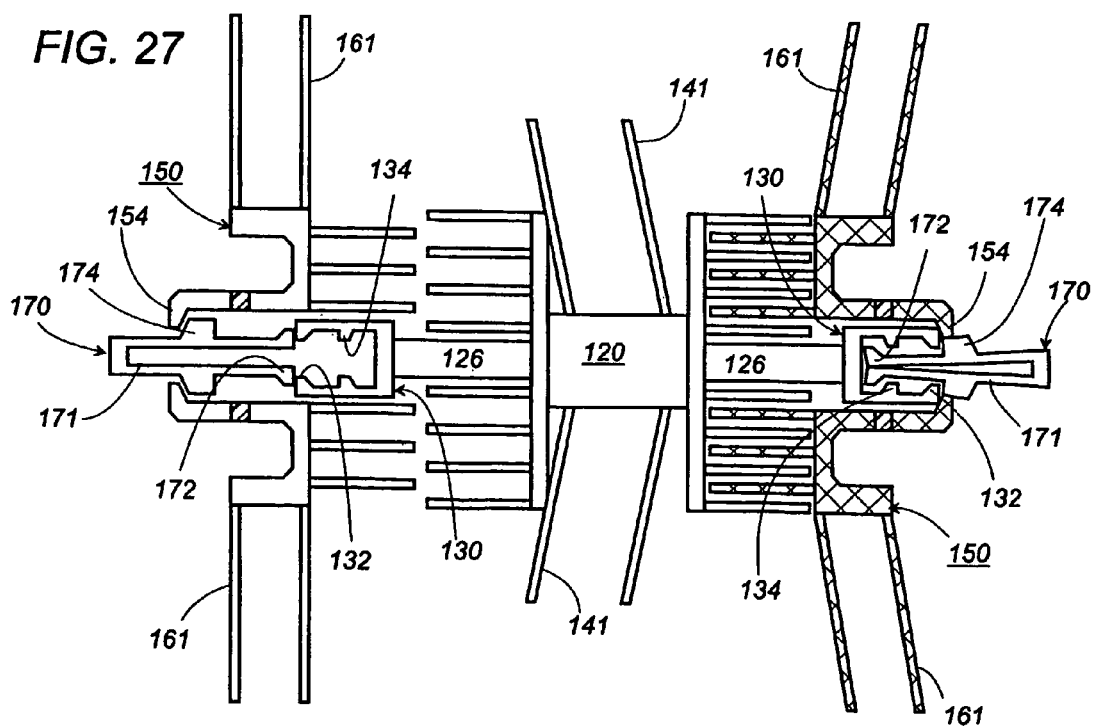
Figure 28:
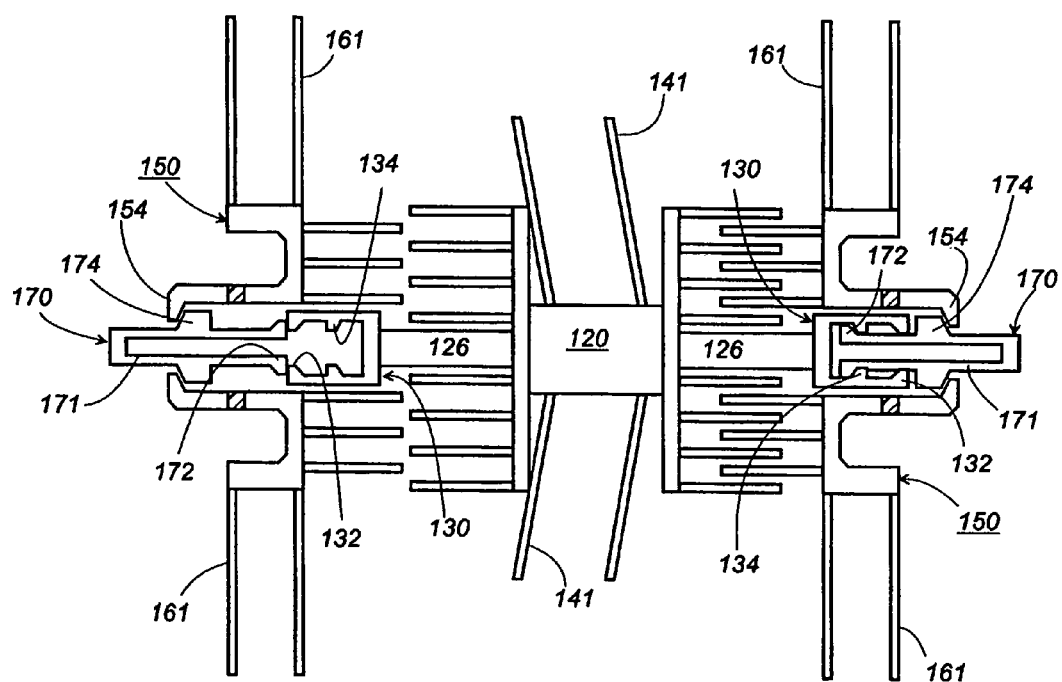

By applying the voltage difference across the right-hand side effector 150 and the actuator 120, the right-hand side effector 150 starts moving to the left, as shown in FIG. 23, pressing the projections 174 on the resilient legs 171 by the release levers 154 to collapse the latch member 170 into the releasing position. Thus, the actuator 120 is unlatched at the right-hand latch member 170, as shown in FIG. 24, and is ready to move to the right with the right-hand socket 130 receiving therein the collapsed resilient legs 171. At the same time, the left-hand socket 130, which is moving to the right, presses the detents 172 at the retainer projections 134 to collapse the resilient legs 171 into the releasing position, thereby being disengaged from the latch member 170 for permitting the actuator 120 to move to the right. As the actuator 120 moves further to the right by being electrostatically attracted to the right-hand side effector 150, as shown in FIG. 25, the right-hand socket 130 keeps the resilient legs 171 collapsed by engagement of the retainer projections 134 with the detents 172. At the same time, the left-hand socket 130 also keeps the resilient legs 171 collapsed by engagement of the catches 132 with the detents 172, thereby permitting the actuator 120 to move further to the right-most position of FIG. 26. In this condition, the resilient legs 171 of the left-hand latch member 170 are caused to escape out of the socket 130 and returns to the lathing position to be ready for the latching engagement with the catches 132 outside of the socket 130. Upon removal of the electrostatic attracting force, the actuator 120 moves back to the left by the bias of the springs 141 only to a slightest extent until the catches 132 abut against the detents 172 at the left-hand latch member 170, as shown in FIG. 27, and is latched in this operative position. Concurrently, the right-hand side effector 150 returns back by the bias of the springs 161 into the normal position, as shown in FIG. 28, completing the actuator movement to the right operative position with the latching of the actuator in this position.

(3) Right Operative Position to the Neutral Position <FIGS. 29 to 32, and FIG. 18>

Figure 29:
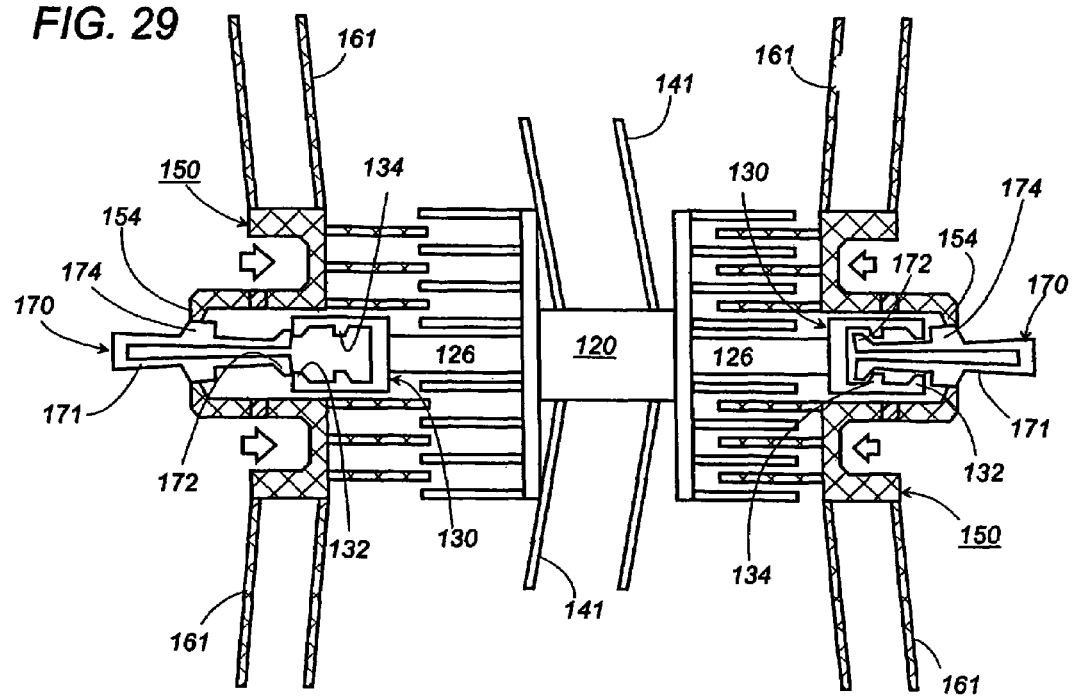
FIGS. 29 to 32 are respectively plan views illustrating the actuator movement from the right position to the neutral position.
Figure 30:
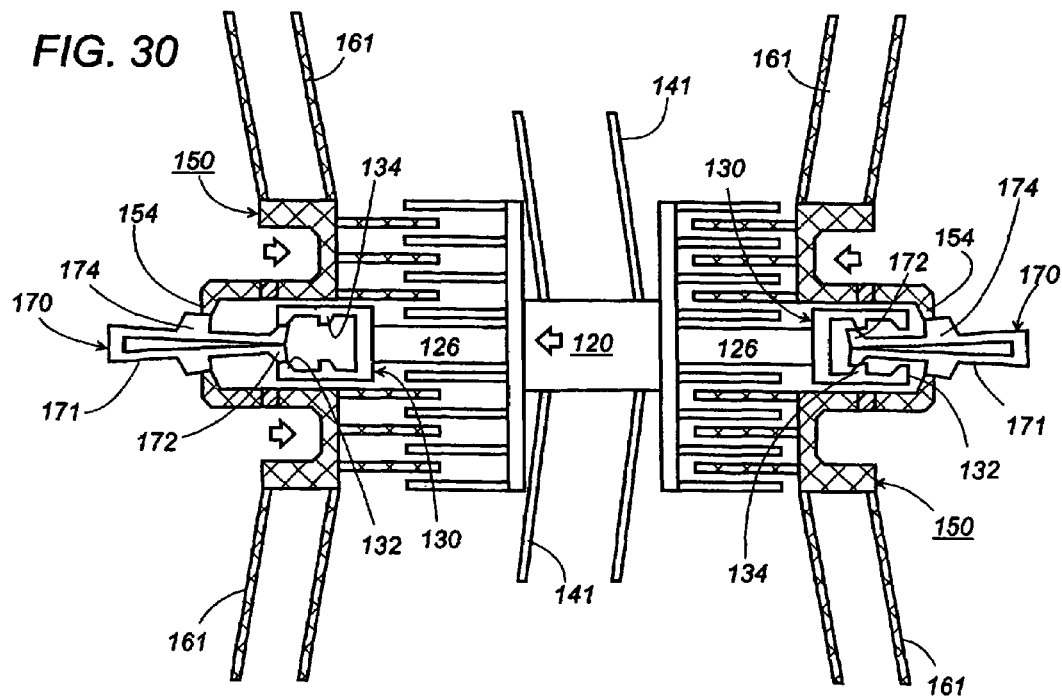
Figure 31:
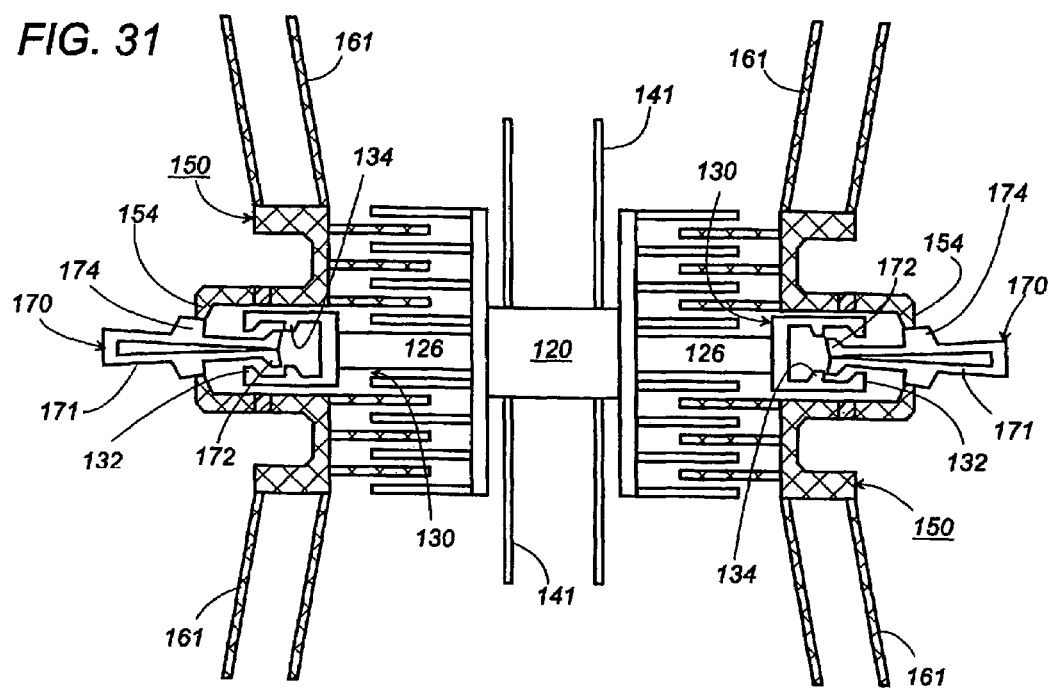
Figure 32:
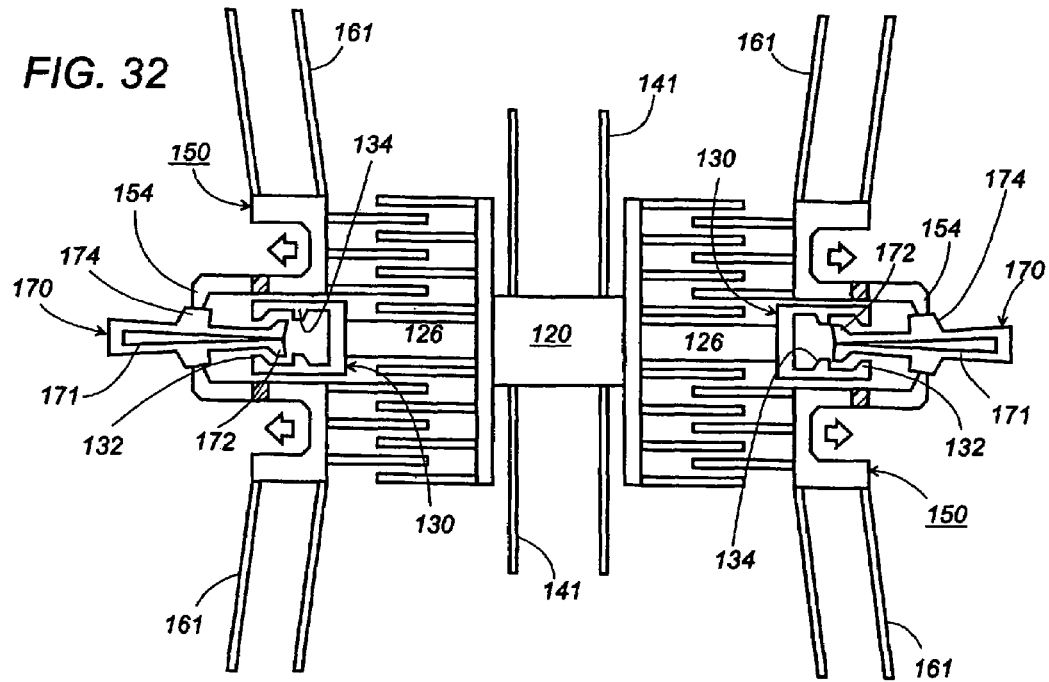

Both of the side effectors 150 are electrically charged while grounding the actuator 120 to give the voltage difference therebetween, i.e., develop the electrostatically attracting forces in order to start moving both of the side effectors 150 towards the actuator 120 in the right operative position, as shown in FIG. 29. In this consequence, the left-hand side effector 150 presses the latch member 170 by the release levers 154 to collapse it into the releasing position, permitting the resilient legs 171 to advance into the socket 130, while the right-hand side effector 150 presses the latch member 170 at the release levers 154 to collapse it also into the releasing position, disengaging the detents 172 from the retainer projections 134 and permitting the detents 172 to move past the retainer projections. Whereby, the actuator 120 is allowed to move towards its neutral position by the bias of the springs 141 and the balancing electrostatic attracting forces, as shown in FIG. 30. After the actuator 120 moves back to the neutral position, as shown in FIG. 31, the side effectors 150 are still held in the shifted position as being electrostatically attracted to the actuator 120 to keep the resilient legs 171 of each latch member 170 collapsed into the releasing position. Upon removal of the electrostatically attracting forces, both of the side effectors 150 starts returning by the bias of the springs 161 towards the normal position, as indicated by arrows in FIG. 32, while disengaging the release levers 154 from the projections 174 and permitting the resilient legs 171 to return by their own resilience with the detents 172 being kept confined within the sockets 130. Thus, both of the side effectors 150 return to their normal or unbiased position, while keeping the actuator 120 in the neutral position, as shown in FIG. 18. In this condition, the detents 172 on the latch members 170 are held axially outwardly of the retainer projections 134 in a closely adjacent relation thereto, which serves to keep the actuator 120 around the neutral position in the absence of the electrostatically attracting force, by the biasing force of the springs 141 and also by the engageable relation between the retainer projections 134 and the detents 172.

Each of the side effectors 150 is formed with dielectric sections 158 which isolate the latch members 170 electrically from the electrodes 152 in order to avoid the latch members 170 from being electrically charged, thereby keeping the intended voltage difference across the side effector 150 and the actuator 120 with which the latch member 170 comes into an electrically conductive relation during the actuator movement. Although each of the side effectors 150 is illustrated in the figures to be divided into two halves, the two halves may be mechanically and electrically coupled to each other.

The invention claimed is:

1. An electrostatically driven latchable actuator system comprising:
   a substrate;
   an actuator carried on said substrate to be movable along a linear axis between two operative positions past a neutral position, said actuator being adapted to be connected to an object for shifting the object, said actuator being formed on its opposite ends respectively with center electrodes with respect to said linear axis, and being resiliently supported to said substrate to be given a spring bias by which said actuator is biased towards said neutral position;
   first and second side effectors carried on said substrate and disposed respectively on opposite ends of said actuator with respect to said linear axis; said side effectors being formed respectively with side electrodes that are held in electrostatically coupling relation with said center electrodes;
   driving means which develops an electrostatically attracting force between said center electrode and said side electrodes for driving said actuator into either one of said two operating position;
   latch means which latches said actuator in one of said operative position against said spring bias when said actuator is moved to said one position, and
   unlatch means which unlatches said actuator to allow it to move out of said one operative position towards the other operative position,
   wherein said side effectors are movable towards and away from said actuator along said linear axis between a normal position and a shifted position close to said actuator,
   said unlatch means is interlocked with the movement of said side effectors in order to unlatch said actuator as one of said side effectors moves to it shifted position, thereby allowing said actuator to move out of one of said operative position and allowing it to move to the other operative position by the electrostatically attracting force developed between said one side effector and said actuator.

2. The system as set forth in claim 1, wherein said latch means comprises:
   catches formed respectively at opposite ends of said actuator, and
   latch members formed on said substrate respectively adjacent to said side effectors,
   each of said latch members having a detent engageable with the associated catch,
   each of said catches assuming two conditions in response to the movement of the actuator, one being a latch-enabled condition where said catch is engageable with said detent for latching said actuator, and the other being a latch-disabled condition where said catch is kept free from engageable with said detent, one of said catches being in said latch-disabled position when the other catch is in said latch-enabled position,
   each one of said catches, in response to the movement of said actuator, coming into said latch-enabled position from said latch-enabled position so as to be held in latching engagement with the associated detent, said unlatch means including release links each mechanically coupling each one of said side effectors to each associated one of said latch members, each of said release links forces each corresponding one of said latch members to move for releasing the engagement of said detent with said catch, in response to said associated one of said side effectors moving to said shifted position, thereby unlatching said actuator.

3. The system as set forth in claim 2, wherein
said release link comprises one or more springs formed on said substrate.

4. The system as set forth in claim 2, wherein
said latch members are electrically isolated respectively from said side electrodes.

5. The system as set forth in claim 2, wherein
said latch member is resiliently supported to said substrate to be movable between a latching position of engaging said detent with the associated catch in said latch-enabled condition, and a releasing position of releasing said detents from said catch in said latch-enabled condition.

6. The system as set forth in claim 5, wherein
both of said catches are held in said latch-disabled condition when said actuator is in said neutral position,
said release link, in response to the movement of the associated one of said side effectors to its shifted position, forcing said latch member into said release position and allowing the associated one of said catches that has been held in said latch-enabled condition to move into said latch-disabled condition, thereby unlatching said actuator and permitting it to move out from one of said operative position,
each one of said catches being engageable with the associated one of said latch members to force it to move from said latching position to the releasing position as said actuator moves in a direction of being unlatched at the other catch, allowing said one catch to move from said latch-disabled condition to said latch-enabled condition such that said latch member resiliently returns thereafter to the latching position for making the latching engagement with said one catch.

7. The system as set forth in claim 1, wherein
said driving means is configured to apply a voltage difference between the side electrode of one of said side effectors and said center electrodes for electrostatically attracting said actuator to said one side effector to move said actuator from said neutral position into one of said operative positions.

8. The system as set forth in claim 1, wherein
said driving means configured to apply a voltage difference between said side electrodes of one of said side effectors and said center electrodes for electrostatically attracting said actuator to said one side effector towards to move said actuator into one of said operative positions from the other operative position.

9. The system as set forth in claim 1, wherein
said driving means configured to apply a voltage difference between said side electrodes of said both side effectors and said center electrodes for moving said actuator into said neutral position from anyone of said operative positions.

10. The system as set forth in claim 1, wherein
said latch means includes retainer means which holds said actuator around said neutral position in the absence of said electrostatically attracting force between said actuator and any one of said side effectors.

11. The system as set forth in claim 1, wherein said latch means comprises:
at least one latch member resiliently supported to said substrate in an adjacent relation to each of said side effectors, said latch member being fixed at its one end to said substrate and being formed at the other free end with a detent;
a socket formed at each opposite end of said actuator for releasably receiving said detent, said socket being provided at its open end with a catch engageable with said detent,
one of said catches abutting against said detent outside of said socket to latch said actuator when said actuator is in either one of said operative positions,
one of said catches engaging with said detent inside of said socket to resilient deform said latch member for allowing said detent to escape outwardly of said socket as said actuator moves by being electrostatically attracted to one of said side effectors, thereby enabling said latch member to resiliently return for engagement with said catch outside of said socket,
said unlatch means comprising a release lever formed at each of said side effectors to be movable together therewith, said release lever being engageable with said least one latch member to resiliently deform it for releasing said detent from said catch and for allowing said dent to advance into said socket as one of said side effectors moves towards said actuator by the electrostatically attracting force.

12. The system as set forth in claim 11, wherein each of said socket is provided in its Interior with a retainer projection spaced inwardly from said catch along said linear axis, said retainer projection being held close to said detent when said actuator is in said neutral position, retaining said actuator around its neutral position in the absence of said electrostatically attracting force between said actuator and any one of said side effectors.

13. An optical switch comprising:
an input optical guide adapted to receive a light signal;
two output optical guides each adapted to output said light signal; and
an actuator system having an actuator carrying a mirror for reflecting the light signal incoming through said input optical guide to one of said output guides,
said actuator system comprising:
a substrate;
an actuator carried on said substrate to be movable along a linear axis between two operative positions past a neutral position, said actuator being connected to said mirror, said actuator being formed on its opposite ends respectively with center electrodes with respect to said linear axis, and being resiliently supported to said substrate to be given a spring bias by which said actuator is biased towards said neutral position;
first and second side effectors carried on said substrate and disposed respectively on opposite ends of said actuator with respect to said linear axis; said side effectors being formed respectively with side electrodes that are held in electrostatically coupling relation with said center electrodes;
driving means which develops an electrostatically attracting force between said center electrode and said side electrodes for driving said actuator into either one of said two operating position;
latch means which latches said actuator in one of said operative position against said spring bias when said actuator is moved to said one position, and unlatch means which unlatches said actuator to allow said actuator to move out of said one operative position towards the other operative position, wherein said side effectors are movable towards and away from said actuator along said linear axis between a normal position and a shifted position close to said actuator, said unlatch means is interlocked with the movement of said side effectors in order to unlatch said actuator as one of said side effectors moves to it shifted position, thereby allowing said actuator to move out of one of said operative position and allowing it to move to the other operative position by the electrostatically force developed between said one side effector and said actuator.

* * * * *